US011922765B2

(12) United States Patent
Higgins et al.

(10) Patent No.: US 11,922,765 B2
(45) Date of Patent: Mar. 5, 2024

(54) SYSTEM AND METHOD EMPLOYING VIRTUAL TICKETS

(71) Applicant: IGT, Las Vegas, NV (US)

(72) Inventors: Kevin Higgins, Reno, NV (US); Erik Petersen, Reno, NV (US)

(73) Assignee: IGT, Las Vegas, NV (US)

( * ) Notice: Subject to any disclaimer, the term of this patent is extended or adjusted under 35 U.S.C. 154(b) by 50 days.

(21) Appl. No.: 15/845,453

(22) Filed: Dec. 18, 2017

(65) Prior Publication Data

US 2019/0188961 A1 Jun. 20, 2019

(51) Int. Cl.
*G07F 17/32* (2006.01)

(52) U.S. Cl.
CPC ...... *G07F 17/3251* (2013.01); *G07F 17/3216* (2013.01); *G07F 17/3223* (2013.01)

(58) Field of Classification Search
CPC ............. G07F 17/3251; G07F 17/3216; G07F 17/3223; A63F 9/24
See application file for complete search history.

(56) References Cited

U.S. PATENT DOCUMENTS

| | | | |
|---|---|---|---|
| 3,662,105 | A | 5/1972 | Hurst |
| 4,071,689 | A | 1/1978 | Talmage |
| 4,072,930 | A | 2/1978 | Lucero |
| D247,828 | S | 5/1978 | Moore et al. |
| 4,159,054 | A | 6/1979 | Yoshida |
| 4,283,709 | A | 8/1981 | Lucero |
| 4,339,709 | A | 7/1982 | Brihier |
| 4,339,798 | A | 7/1982 | Hedges |
| 4,553,222 | A | 11/1985 | Kurland |
| 4,856,787 | A | 8/1989 | Itkis |
| 5,038,022 | A | 8/1991 | Lucero |
| 5,042,809 | A | 8/1991 | Richardson |
| 5,048,831 | A | 9/1991 | Sides |
| 5,179,517 | A | 1/1993 | Sarbin |
| 5,221,838 | A | 6/1993 | Gutman |
| 5,265,874 | A | 11/1993 | Dickinson et al. |
| 5,287,269 | A | 2/1994 | Dorrough et al. |
| 5,290,033 | A | 3/1994 | Bittner et al. |
| 5,371,345 | A | 12/1994 | Lestrange |
| D359,765 | S | 6/1995 | Izawa |
| 5,429,361 | A | 7/1995 | Raven |
| 5,457,306 | A | 10/1995 | Lucero |
| 5,470,079 | A | 11/1995 | LeStrange et al. |

(Continued)

FOREIGN PATENT DOCUMENTS

| | | |
|---|---|---|
| EA | 008726 | 8/2007 |
| EP | 1895483 | 3/2008 |

(Continued)

OTHER PUBLICATIONS

EZ Pay® Card Accounts Advertisement, written by IGT, published in 2013 (1 page).

(Continued)

*Primary Examiner* — Yingchuan Zhang
(74) *Attorney, Agent, or Firm* — Neal, Gerber & Eisenberg LLP

(57) ABSTRACT

The present disclosure relates generally to a system that utilizes a virtual ticket audit device to account for the transfer of virtual ticket vouchers between different components of a gaming establishment ecosystem.

19 Claims, 6 Drawing Sheets

(56) References Cited

U.S. PATENT DOCUMENTS

| | | | |
|---|---|---|---|
| 5,483,049 | A | 1/1996 | Schulze, Jr. |
| 5,559,312 | A | 9/1996 | Lucero |
| 5,618,045 | A | 4/1997 | Kagan |
| 5,643,086 | A | 7/1997 | Alcorn |
| 5,655,961 | A | 8/1997 | Acres |
| 5,676,231 | A | 10/1997 | Legras |
| 5,702,304 | A | 12/1997 | Acres |
| 5,718,632 | A | 2/1998 | Hayashi |
| 5,741,183 | A | 4/1998 | Acres |
| 5,759,102 | A | 6/1998 | Pease |
| 5,761,647 | A | 6/1998 | Boushy |
| 5,768,382 | A | 6/1998 | Schneier |
| 5,769,716 | A | 6/1998 | Saffari |
| 5,770,533 | A | 6/1998 | Franchi |
| 5,779,545 | A | 7/1998 | Berg |
| 5,788,573 | A | 8/1998 | Baerlocher |
| 5,795,228 | A | 8/1998 | Trumbull |
| 5,796,389 | A | 8/1998 | Bertram |
| 5,797,085 | A | 8/1998 | Beuk |
| 5,809,482 | A | 9/1998 | Strisower |
| 5,811,772 | A | 9/1998 | Lucero |
| 5,816,918 | A | 10/1998 | Kelly |
| 5,818,019 | A | 10/1998 | Irwin, Jr |
| 5,833,536 | A | 11/1998 | Davids |
| 5,833,540 | A | 11/1998 | Miodunski |
| 5,836,819 | A | 11/1998 | Ugawa |
| 5,851,148 | A | 12/1998 | Brune |
| 5,871,398 | A | 2/1999 | Schneier |
| D406,612 | S | 3/1999 | Johnson |
| 5,885,158 | A | 3/1999 | Torango |
| 5,919,091 | A | 7/1999 | Bell |
| 5,943,624 | A | 8/1999 | Fox et al. |
| 5,951,397 | A | 9/1999 | Dickinson |
| 5,952,640 | A | 9/1999 | Lucero |
| 5,954,583 | A | 9/1999 | Green |
| 5,957,776 | A | 9/1999 | Hoehne |
| 5,959,277 | A | 9/1999 | Lucero |
| 5,967,896 | A | 10/1999 | Jorasch |
| 5,971,271 | A | 10/1999 | Wynn |
| 5,984,779 | A | 11/1999 | Bridgeman |
| 5,999,808 | A | 12/1999 | Ladue |
| 6,001,016 | A | 12/1999 | Walker |
| 6,003,013 | A | 12/1999 | Boushy |
| 6,003,651 | A | 12/1999 | Waller |
| 6,010,404 | A | 1/2000 | Walker |
| 6,012,832 | A | 1/2000 | Saunders |
| 6,012,983 | A | 1/2000 | Walker |
| 6,019,283 | A | 2/2000 | Lucero |
| 6,038,666 | A | 3/2000 | Hsu |
| 6,048,269 | A | 4/2000 | Burns |
| 6,050,895 | A | 4/2000 | Luciano |
| 6,062,981 | A | 5/2000 | Luciano |
| 6,068,552 | A | 5/2000 | Walker |
| 6,077,163 | A | 6/2000 | Walker |
| 6,089,975 | A | 7/2000 | Dunn |
| 6,099,408 | A | 8/2000 | Schneier |
| 6,104,815 | A | 8/2000 | Alcorn |
| 6,106,396 | A | 8/2000 | Alcorn |
| 6,110,041 | A | 8/2000 | Walker et al. |
| 6,113,492 | A | 9/2000 | Walker |
| 6,113,493 | A | 9/2000 | Walker |
| 6,113,495 | A | 9/2000 | Walker |
| 6,135,884 | A | 10/2000 | Hedrick |
| 6,135,887 | A | 10/2000 | Pease |
| 6,139,431 | A | 10/2000 | Walker |
| 6,141,711 | A | 10/2000 | Shah |
| 6,142,369 | A | 11/2000 | Jonstromer |
| 6,149,522 | A | 11/2000 | Alcorn |
| 6,161,059 | A | 12/2000 | Tedesco |
| 6,162,121 | A | 12/2000 | Morro |
| 6,162,122 | A | 12/2000 | Acres |
| 6,174,234 | B1 | 1/2001 | Seibert, Jr. |
| 6,182,221 | B1 | 1/2001 | Hsu |
| 6,183,362 | B1 | 2/2001 | Boushy |
| 6,190,256 | B1 | 2/2001 | Walker |
| 6,206,283 | B1 | 3/2001 | Bansal |
| 6,210,279 | B1 | 4/2001 | Dickinson |
| 6,223,166 | B1 | 4/2001 | Kay |
| 6,227,972 | B1 | 5/2001 | Walker |
| 6,244,958 | B1 | 6/2001 | Acres |
| 6,247,643 | B1 | 6/2001 | Lucero |
| 6,253,119 | B1 | 6/2001 | Dabrowski |
| 6,264,560 | B1 | 7/2001 | Goldberg |
| 6,264,561 | B1 | 7/2001 | Saffari |
| 6,267,671 | B1 | 7/2001 | Hogan |
| 6,270,410 | B1 | 8/2001 | Demar |
| 6,280,328 | B1 | 8/2001 | Holch |
| 6,285,868 | B1 | 9/2001 | Ladue |
| 6,293,866 | B1 | 9/2001 | Walker |
| 6,302,790 | B1 | 10/2001 | Brossard |
| 6,307,956 | B1 | 10/2001 | Black |
| 6,319,125 | B1 | 11/2001 | Acres |
| 6,341,353 | B1 | 1/2002 | Herman |
| 6,368,216 | B1 | 4/2002 | Hedrick |
| 6,371,852 | B1 | 4/2002 | Acres |
| 6,378,073 | B1 | 4/2002 | Davis |
| 6,379,246 | B1 | 4/2002 | Dabrowski |
| 6,383,076 | B1 | 5/2002 | Tiedeken |
| 6,409,595 | B1 | 6/2002 | Uihlein |
| 6,409,602 | B1 | 6/2002 | Wiltshire |
| 6,443,843 | B1 | 9/2002 | Walker |
| 6,450,885 | B2 | 9/2002 | Schneier |
| 6,488,585 | B1 | 12/2002 | Wells |
| 6,496,928 | B1 | 12/2002 | Deo |
| 6,530,835 | B1 | 3/2003 | Walker |
| 6,561,903 | B2 | 5/2003 | Walker |
| 6,581,161 | B1 | 6/2003 | Byford |
| 6,582,310 | B1 | 6/2003 | Walker |
| 6,585,598 | B2 | 7/2003 | Nguyen |
| 6,628,939 | B2 | 9/2003 | Paulsen |
| 6,634,550 | B1 | 10/2003 | Walker et al. |
| 6,648,761 | B1 | 11/2003 | Izawa et al. |
| 6,676,522 | B2 | 1/2004 | Rowe et al. |
| 6,682,421 | B1 | 1/2004 | Rowe |
| 6,685,567 | B2 | 2/2004 | Cockerille |
| 6,702,670 | B2 | 3/2004 | Jasper et al. |
| 6,712,191 | B2 | 3/2004 | Hand |
| D488,512 | S | 4/2004 | Knobel |
| D490,473 | S | 5/2004 | Knobel |
| 6,739,975 | B2 | 5/2004 | Nguyen |
| 6,758,393 | B1 | 7/2004 | Luciano |
| 6,800,029 | B2 | 10/2004 | Rowe |
| 6,831,682 | B1 | 12/2004 | Silverbrook et al. |
| 6,846,238 | B2 | 1/2005 | Wells |
| 6,852,031 | B1 | 2/2005 | Rowe |
| 6,869,362 | B2 | 3/2005 | Walker |
| 6,880,079 | B2 | 4/2005 | Kefford |
| 6,896,618 | B2 | 5/2005 | Benoy |
| 6,905,411 | B2 | 6/2005 | Nguyen et al. |
| 6,935,957 | B1 | 8/2005 | Yates et al. |
| 6,969,319 | B2 | 11/2005 | Rowe et al. |
| 7,004,388 | B2 | 2/2006 | Kohta |
| 7,004,837 | B1 | 2/2006 | Crowder et al. |
| D523,482 | S | 6/2006 | Uemizo |
| 7,153,210 | B2 | 12/2006 | Yamagishi |
| 7,167,724 | B2 | 1/2007 | Yamagishi |
| 7,169,052 | B2 | 1/2007 | Beaulieu et al. |
| 7,213,750 | B1 | 5/2007 | Barnes et al. |
| D547,806 | S | 7/2007 | Uemizo |
| 7,275,991 | B2 | 10/2007 | Burns |
| 7,331,520 | B2 | 2/2008 | Silva |
| 7,335,106 | B2 | 2/2008 | Johnson |
| 7,337,330 | B2 | 2/2008 | Gatto |
| 7,341,522 | B2 | 3/2008 | Yamagishi |
| 7,403,788 | B2 | 7/2008 | Trioano et al. |
| 7,416,485 | B2 | 8/2008 | Walker |
| 7,419,428 | B2 | 9/2008 | Rowe |
| 7,467,999 | B2 | 12/2008 | Walker |
| 7,477,889 | B2 | 1/2009 | Kim |
| 7,510,474 | B2 | 3/2009 | Carter, Sr. |
| 7,545,522 | B1 | 6/2009 | Lou |
| 7,552,341 | B2 | 6/2009 | Chen |
| 7,594,855 | B2 | 9/2009 | Meyerhofer |
| 7,611,409 | B2 | 11/2009 | Muir et al. |

(56) References Cited

U.S. PATENT DOCUMENTS

| | | | |
|---|---|---|---|
| 7,644,861 | B2 | 1/2010 | Alderucci |
| 7,693,306 | B2 | 4/2010 | Huber |
| 7,699,703 | B2 | 4/2010 | Muir |
| 7,701,344 | B2 | 4/2010 | Mattice et al. |
| 7,753,789 | B2 | 7/2010 | Walker et al. |
| 7,758,420 | B2 | 7/2010 | Saffari |
| 7,771,271 | B2 | 8/2010 | Walker et al. |
| 7,785,193 | B2 | 8/2010 | Paulsen et al. |
| 7,803,053 | B2 | 9/2010 | Atkinson |
| D628,576 | S | 12/2010 | Daniel |
| 7,846,017 | B2 | 12/2010 | Walker et al. |
| 7,850,522 | B2 | 12/2010 | Walker et al. |
| 7,883,417 | B2 | 2/2011 | Bruzzese |
| 7,950,996 | B2 | 5/2011 | Nguyen et al. |
| 7,988,550 | B2 | 8/2011 | White |
| 7,997,972 | B2 | 8/2011 | Nguyen et al. |
| 8,016,666 | B2 | 9/2011 | Angell et al. |
| 8,023,133 | B2 | 9/2011 | Kaneko |
| 8,038,527 | B2 | 10/2011 | Walker et al. |
| 8,057,303 | B2 | 11/2011 | Rasmussen |
| 8,079,904 | B2 | 12/2011 | Griswold |
| 8,096,872 | B2 | 1/2012 | Walker et al. |
| 8,118,668 | B2 | 2/2012 | Gagner et al. |
| 8,144,356 | B2 | 3/2012 | Meyerhofer |
| 8,157,642 | B2 | 4/2012 | Paulsen |
| 8,192,276 | B2 | 6/2012 | Walker et al. |
| 8,219,129 | B2 | 7/2012 | Brown |
| 8,220,019 | B2 | 7/2012 | Stearns et al. |
| 8,241,127 | B2 | 8/2012 | Kovacs |
| 8,282,465 | B2 | 10/2012 | Giobbi |
| 8,282,490 | B2 | 10/2012 | Arezina |
| 8,286,856 | B2 | 10/2012 | Meyerhofer et al. |
| 8,393,955 | B2 | 3/2013 | Arezina et al. |
| 8,419,548 | B2 | 4/2013 | Gagner |
| 8,469,800 | B2 | 6/2013 | Lemay et al. |
| 8,512,144 | B2 | 8/2013 | Johnson et al. |
| 8,550,903 | B2 | 10/2013 | Lyons |
| 8,597,108 | B2 | 12/2013 | Nguyen |
| 8,597,111 | B2 | 12/2013 | Lemay et al. |
| 8,602,875 | B2 | 12/2013 | Nguyen |
| 8,608,569 | B2 | 12/2013 | Carrico |
| 8,613,659 | B2 | 12/2013 | Nelson |
| 8,613,668 | B2 | 12/2013 | Nelson et al. |
| 8,622,836 | B2 | 1/2014 | Nelson et al. |
| 8,721,434 | B2 | 5/2014 | Nelson et al. |
| 8,734,236 | B2 | 5/2014 | Arezina et al. |
| 8,814,683 | B2 | 8/2014 | Hollander et al. |
| 8,827,813 | B2 | 9/2014 | Lemay et al. |
| 8,827,814 | B2 | 9/2014 | Lemay et al. |
| 8,876,595 | B2 | 11/2014 | Nelson et al. |
| 8,932,140 | B2 | 1/2015 | Gagner et al. |
| 8,956,222 | B2 | 2/2015 | Lemay et al. |
| 8,961,306 | B2 | 2/2015 | Lemay |
| 8,978,868 | B2 | 3/2015 | Johnson et al. |
| 9,011,236 | B2 | 4/2015 | Nelson et al. |
| 9,153,095 | B2 | 10/2015 | Adiraju et al. |
| 2001/0039204 | A1 | 11/2001 | Tanskanen |
| 2001/0044337 | A1 | 11/2001 | Rowe |
| 2002/0020603 | A1 | 2/2002 | Jones |
| 2002/0061778 | A1 | 5/2002 | Acres |
| 2002/0077182 | A1 | 6/2002 | Swanberg |
| 2002/0082070 | A1 | 6/2002 | Macke et al. |
| 2002/0087641 | A1 | 7/2002 | Levosky |
| 2002/0090986 | A1 | 7/2002 | Cote et al. |
| 2002/0094869 | A1 | 7/2002 | Harkham |
| 2002/0107066 | A1 | 8/2002 | Seelig |
| 2002/0111206 | A1 | 8/2002 | Van Baltz et al. |
| 2002/0111209 | A1 | 8/2002 | Walker |
| 2002/0132666 | A1 | 9/2002 | Lind |
| 2002/0145035 | A1 | 10/2002 | Jones |
| 2002/0147047 | A1 | 10/2002 | Letovsky |
| 2002/0147049 | A1 | 10/2002 | Carter, Sr. |
| 2002/0163570 | A1 | 11/2002 | Phillips |
| 2002/0169623 | A1 | 11/2002 | Call et al. |
| 2002/0183046 | A1 | 12/2002 | Joyce et al. |
| 2002/0196342 | A1 | 12/2002 | Walker |
| 2003/0003988 | A1 | 1/2003 | Walker |
| 2003/0008707 | A1 | 1/2003 | Walker et al. |
| 2003/0027632 | A1 | 2/2003 | Sines |
| 2003/0032485 | A1 | 2/2003 | Cockerille |
| 2003/0045354 | A1 | 3/2003 | Giobbi |
| 2003/0054868 | A1 | 3/2003 | Paulsen et al. |
| 2003/0054881 | A1 | 3/2003 | Hedrick |
| 2003/0064805 | A1 | 4/2003 | Wells |
| 2003/0074259 | A1 | 4/2003 | Slyman et al. |
| 2003/0083126 | A1 | 5/2003 | Paulsen |
| 2003/0083943 | A1 | 5/2003 | Adams |
| 2003/0092477 | A1 | 5/2003 | Luciano et al. |
| 2003/0104865 | A1 | 6/2003 | Itkis |
| 2003/0141359 | A1 | 7/2003 | Dymovsky |
| 2003/0144052 | A1 | 7/2003 | Walker |
| 2003/0148812 | A1 | 8/2003 | Paulsen |
| 2003/0162591 | A1 | 8/2003 | Nguyen et al. |
| 2003/0172037 | A1 | 9/2003 | Jung |
| 2003/0186739 | A1 | 10/2003 | Paulsen et al. |
| 2003/0199321 | A1 | 10/2003 | Williams |
| 2003/0203756 | A1 | 10/2003 | Jackson |
| 2003/0224852 | A1 | 12/2003 | Walker |
| 2003/0228900 | A1 | 12/2003 | Yamagishi |
| 2004/0014514 | A1 | 1/2004 | Yacenda |
| 2004/0016797 | A1 | 1/2004 | Jones |
| 2004/0023721 | A1 | 2/2004 | Giobbi |
| 2004/0039635 | A1 | 2/2004 | Linde |
| 2004/0043814 | A1 | 3/2004 | Angell et al. |
| 2004/0085293 | A1 | 5/2004 | Soper |
| 2004/0088250 | A1 | 5/2004 | Bartter et al. |
| 2004/0106454 | A1 | 6/2004 | Walker |
| 2004/0127277 | A1 | 7/2004 | Walker |
| 2004/0129773 | A1 | 7/2004 | Lute, Jr. |
| 2004/0147314 | A1 | 7/2004 | Lemay |
| 2004/0185935 | A1 | 9/2004 | Yamagishi |
| 2004/0190042 | A1 | 9/2004 | Ferlitsch et al. |
| 2004/0192434 | A1 | 9/2004 | Walker |
| 2004/0199284 | A1 | 10/2004 | Hara |
| 2004/0209690 | A1 | 10/2004 | Bruzzese |
| 2004/0225565 | A1 | 11/2004 | Selman |
| 2004/0230527 | A1 | 11/2004 | Hansen et al. |
| 2004/0259640 | A1 | 12/2004 | Gentles |
| 2004/0266395 | A1 | 12/2004 | Pailles |
| 2005/0014554 | A1 | 1/2005 | Walker |
| 2005/0020354 | A1 | 1/2005 | Nguyen et al. |
| 2005/0049049 | A1 | 3/2005 | Griswold et al. |
| 2005/0054438 | A1 | 3/2005 | Rothschild |
| 2005/0059485 | A1 | 3/2005 | Paulsen |
| 2005/0070257 | A1 | 3/2005 | Saarinen |
| 2005/0076242 | A1 | 4/2005 | Breuer |
| 2005/0101383 | A1 | 5/2005 | Wells |
| 2005/0130728 | A1 | 6/2005 | Nguyen |
| 2005/0173220 | A1 | 8/2005 | Liu et al. |
| 2005/0227770 | A1 | 10/2005 | Papulov |
| 2005/0240484 | A1 | 10/2005 | Yan |
| 2005/0255911 | A1 | 11/2005 | Nguyen et al. |
| 2005/0287852 | A1 | 12/2005 | Sugawara |
| 2006/0018450 | A1 | 1/2006 | Sandberg-Diment |
| 2006/0025206 | A1 | 2/2006 | Walker |
| 2006/0025222 | A1 | 2/2006 | Sekine |
| 2006/0035707 | A1 | 2/2006 | Nguyen |
| 2006/0040741 | A1 | 2/2006 | Griswold |
| 2006/0046823 | A1 | 3/2006 | Kaminkow |
| 2006/0046834 | A1 | 3/2006 | Sekine |
| 2006/0046842 | A1 | 3/2006 | Mattice |
| 2006/0046855 | A1 | 3/2006 | Nguyen et al. |
| 2006/0049624 | A1 | 3/2006 | Brosnan et al. |
| 2006/0064372 | A1 | 3/2006 | Gupta |
| 2006/0079333 | A1 | 4/2006 | Morrow |
| 2006/0089174 | A1 | 4/2006 | Twerdahl |
| 2006/0118382 | A1 | 6/2006 | Yoshioka |
| 2006/0160621 | A1 | 7/2006 | Rowe et al. |
| 2006/0165060 | A1 | 7/2006 | Dua |
| 2006/0166732 | A1 | 7/2006 | Lechner et al. |
| 2006/0166741 | A1 | 7/2006 | Boyd et al. |
| 2006/0173781 | A1 | 8/2006 | Donner |
| 2006/0189382 | A1 | 8/2006 | Muir |
| 2006/0223627 | A1 | 10/2006 | Nozaki |

(56) References Cited

U.S. PATENT DOCUMENTS

2006/0226598 A1 10/2006 Walker
2006/0246981 A1 11/2006 Walker et al.
2006/0247037 A1 11/2006 Park
2006/0258439 A1 11/2006 White
2006/0266598 A1 11/2006 Baumgartner et al.
2006/0271433 A1 11/2006 Hughes
2006/0279781 A1 12/2006 Kaneko
2006/0281554 A1 12/2006 Gatto et al.
2006/0287072 A1 12/2006 Walker
2006/0287098 A1 12/2006 Morrow et al.
2007/0017979 A1 1/2007 Wu et al.
2007/0021198 A1 1/2007 Muir
2007/0060302 A1 3/2007 Fabbri
2007/0060372 A1 3/2007 Yamagishi
2007/0117608 A1 5/2007 Roper et al.
2007/0117623 A1 5/2007 Nelson
2007/0129150 A1 6/2007 Crowder et al.
2007/0129151 A1 6/2007 Crowder et al.
2007/0155469 A1 7/2007 Johnson
2007/0159301 A1 7/2007 Hirt
2007/0174809 A1 7/2007 Brown
2007/0190494 A1 8/2007 Rosenberg
2007/0197247 A1 8/2007 Inselberg
2007/0202941 A1 8/2007 Miltenberger et al.
2007/0218971 A1 9/2007 Berube
2007/0218985 A1 9/2007 Okada
2007/0218991 A1 9/2007 Okada
2007/0238505 A1 10/2007 Okada
2007/0243928 A1 10/2007 Iddings
2007/0267488 A1 11/2007 Chang
2008/0011832 A1 1/2008 Chang
2008/0026816 A1 1/2008 Sammon
2008/0026823 A1 1/2008 Wolf et al.
2008/0026844 A1 1/2008 Wells
2008/0070671 A1 3/2008 Okada
2008/0076528 A1 3/2008 Nguyen et al.
2008/0076572 A1 3/2008 Nguyen et al.
2008/0085753 A1 4/2008 Okada
2008/0139306 A1 6/2008 Lutnick
2008/0166997 A1 7/2008 Sun et al.
2008/0182644 A1 7/2008 Lutnick et al.
2008/0200240 A1 8/2008 Saltiel et al.
2008/0200251 A1 8/2008 Alderucci et al.
2008/0207296 A1 8/2008 Lutnick et al.
2008/0213026 A1 9/2008 Grabiec
2008/0220878 A1 9/2008 Michaelis
2008/0234028 A1 9/2008 Meyer et al.
2008/0261682 A1 10/2008 Phillips
2008/0268934 A1 10/2008 Mattice et al.
2008/0270302 A1 10/2008 Beenau et al.
2008/0293483 A1 11/2008 Pickus
2008/0300047 A1 12/2008 Nagano
2008/0300061 A1 12/2008 Zheng
2008/0305860 A1 12/2008 Linner
2008/0305862 A1 12/2008 Walker et al.
2008/0305873 A1 12/2008 Zheng
2008/0311971 A1 12/2008 Dean
2008/0318655 A1 12/2008 Davies
2009/0011821 A1 1/2009 Griswold
2009/0023490 A1 1/2009 Moshal
2009/0029766 A1 1/2009 Lutnick
2009/0054149 A1 2/2009 Brosnan et al.
2009/0098943 A1 4/2009 Weber et al.
2009/0124350 A1 5/2009 Iddings et al.
2009/0124376 A1 5/2009 Kelly et al.
2009/0125429 A1 5/2009 Takayama
2009/0131134 A1 5/2009 Baerlocher et al.
2009/0131146 A1 5/2009 Arezina et al.
2009/0158400 A1 6/2009 Miyake
2009/0186680 A1 7/2009 Napolitano
2009/0197684 A1 8/2009 Arezina
2009/0227317 A1 9/2009 Spangler
2009/0233715 A1 9/2009 Ergen
2009/0275397 A1 11/2009 Van Baltz et al.
2009/0313084 A1 12/2009 Chugh
2009/0328144 A1 12/2009 Sherlock et al.
2010/0012715 A1 1/2010 Williams
2010/0016075 A1 1/2010 Thomas
2010/0029376 A1 2/2010 Hardy et al.
2010/0036758 A1 2/2010 Monk
2010/0048291 A1 2/2010 Warkentin
2010/0048297 A1 2/2010 Dasgupta
2010/0062840 A1 3/2010 Herrmann
2010/0069160 A1 3/2010 Barrett
2010/0087241 A1 4/2010 Nguyen
2010/0087249 A1 4/2010 Rowe
2010/0093421 A1 4/2010 Nyman
2010/0093429 A1 4/2010 Mattice
2010/0094734 A1 4/2010 Wang
2010/0113061 A1 5/2010 Holcman
2010/0113161 A1 5/2010 Walker
2010/0155462 A1 6/2010 Morrison et al.
2010/0173691 A1 7/2010 Wolfe
2010/0174650 A1 7/2010 Nonaka
2010/0178986 A1 7/2010 Davis et al.
2010/0222100 A1 8/2010 Fisk
2010/0219234 A1 9/2010 Forbes
2010/0225653 A1 9/2010 Sao et al.
2010/0227670 A1 9/2010 Arezina et al.
2010/0234099 A1 9/2010 Rasmussen
2010/0250787 A1 9/2010 Miyata
2010/0304848 A1 12/2010 Detlefsen
2010/0323785 A1 12/2010 Motyl
2010/0323789 A1 12/2010 Gabriele
2010/0331079 A1 12/2010 Bytnar
2011/0015976 A1 1/2011 Lempel et al.
2011/0028199 A1 2/2011 Luciano et al.
2011/0035319 A1 2/2011 Brand et al.
2011/0057028 A1 3/2011 Schwartz
2011/0065496 A1 3/2011 Gagner et al.
2011/0065497 A1 3/2011 Patterson, Jr.
2011/0070940 A1 3/2011 Jaffe
2011/0076963 A1 3/2011 Hatano
2011/0086691 A1 4/2011 Luciano et al.
2011/0086696 A1 4/2011 Macewan
2011/0098104 A1 4/2011 Meyerhofer
2011/0118008 A1 5/2011 Taylor
2011/0119098 A1 5/2011 Miller
2011/0136576 A1 6/2011 Kammler et al.
2011/0166989 A1 7/2011 Ross et al.
2011/0207531 A1* 8/2011 Gagner .............. G07F 17/3248
463/30
2011/0208418 A1 8/2011 Looney et al.
2011/0242565 A1 10/2011 Armstrong
2011/0263325 A1 10/2011 Atkinson
2011/0287823 A1 11/2011 Guinn et al.
2011/0295668 A1 12/2011 Charania
2011/0306400 A1 12/2011 Nguyen
2011/0306401 A1 12/2011 Nguyen
2011/0307318 A1 12/2011 Laporte et al.
2011/0314153 A1 12/2011 Bathiche
2012/0015735 A1 1/2012 Abouchar
2012/0046110 A1 2/2012 Amaitis
2012/0047008 A1 3/2012 Alhadeff et al.
2012/0066048 A1 3/2012 Foust et al.
2012/0067944 A1 3/2012 Ross
2012/0072111 A1 3/2012 Davis
2012/0084131 A1 4/2012 Bergel et al.
2012/0094757 A1 4/2012 Vago
2012/0115593 A1 5/2012 Vann et al.
2012/0122584 A1 5/2012 Nguyen
2012/0122585 A1 5/2012 Nguyen
2012/0129586 A1 5/2012 Lutnick
2012/0129611 A1 5/2012 Rasmussen
2012/0149561 A1 6/2012 Ribi et al.
2012/0187187 A1 7/2012 Duff
2012/0190455 A1 7/2012 Briggs
2012/0208627 A1 8/2012 Kitakaze et al.
2012/0221474 A1 8/2012 Eicher et al.
2012/0239552 A1 9/2012 Harycki
2012/0252556 A1 10/2012 Doyle et al.
2012/0265681 A1 10/2012 Ross
2012/0276990 A1 11/2012 Arezina
2012/0290336 A1 11/2012 Rosenblatt

(56) References Cited

U.S. PATENT DOCUMENTS

2012/0296174 A1 11/2012 McCombie
2012/0300753 A1 11/2012 Brown
2012/0311322 A1 12/2012 Koyun
2012/0315984 A1 12/2012 Carrico et al.
2012/0324135 A1 12/2012 Goodman
2013/0013389 A1 1/2013 Vitti et al.
2013/0017877 A1 1/2013 Dahl
2013/0017884 A1 1/2013 Price
2013/0023339 A1 1/2013 Davis
2013/0053133 A1 2/2013 Schueller
2013/0053136 A1 2/2013 Lemay et al.
2013/0053148 A1 2/2013 Nelson et al.
2013/0065667 A1 3/2013 Nelson et al.
2013/0065668 A1* 3/2013 LeMay ............... G07F 17/3225 463/43
2013/0065678 A1* 3/2013 Nelson ................... G06Q 20/32 463/29
2013/0065686 A1 3/2013 Lemay et al.
2013/0085943 A1 4/2013 Takeda et al.
2013/0090155 A1 4/2013 Johnson
2013/0124413 A1 5/2013 Itwaru
2013/0130777 A1 5/2013 Lemay et al.
2013/0130778 A1 5/2013 Anderson et al.
2013/0137509 A1 5/2013 Weber et al.
2013/0137510 A1 5/2013 Weber et al.
2013/0137516 A1 5/2013 Griswold et al.
2013/0165199 A1 6/2013 Lemay
2013/0165208 A1 6/2013 Nelson
2013/0165209 A1 6/2013 Lemay
2013/0165210 A1 6/2013 Nelson
2013/0165231 A1 6/2013 Nelson
2013/0165232 A1 6/2013 Nelson
2013/0190077 A1 7/2013 Arezina et al.
2013/0196755 A1 8/2013 Nelson
2013/0225279 A1 8/2013 Patceg et al.
2013/0244772 A1 9/2013 Weber
2013/0252713 A1 9/2013 Nelson
2013/0260889 A1 10/2013 Lemay et al.
2013/0275314 A1 10/2013 Bowles
2013/0299574 A1 11/2013 Theobald
2013/0316808 A1 11/2013 Nelson
2013/0317987 A1 11/2013 Tsutsui
2013/0324237 A1 12/2013 Adiraju et al.
2013/0337890 A1 12/2013 Earley et al.
2013/0344942 A1 12/2013 Price et al.
2014/0018153 A1 1/2014 Nelson et al.
2014/0045586 A1 2/2014 Allen et al.
2014/0080578 A1* 3/2014 Nguyen .............. G07F 17/3241 463/25
2014/0087865 A1 3/2014 Carrico et al.
2014/0121005 A1 5/2014 Nelson et al.
2014/0200065 A1 7/2014 Anderson
2014/0221099 A1 8/2014 Johnson
2014/0248941 A1 9/2014 Nelson et al.
2014/0274306 A1 9/2014 Crawford, III
2014/0323206 A1 10/2014 Gagner et al.
2014/0357353 A1 12/2014 Popovich
2015/0012305 A1 1/2015 Truskovsky
2015/0065231 A1 3/2015 Anderson et al.
2015/0087408 A1 3/2015 Siemasko et al.
2015/0170473 A1 6/2015 Hematji et al.
2015/0187158 A1 7/2015 Johnson et al.
2015/0319613 A1 11/2015 Shmilov
2016/0071373 A1 3/2016 Anderson et al.
2016/0093166 A1 3/2016 Panambur et al.
2017/0092054 A1 3/2017 Petersen et al.

FOREIGN PATENT DOCUMENTS

JP 2001-243376 9/2001
JP 2002-123619 4/2002
JP 2007-082934 4/2007
JP 2007-141055 6/2007
JP 2007-328388 12/2007
JP 2008-027117 7/2008
JP 2008-171203 7/2008
JP 2008-228848 10/2008
JP 2008-287446 11/2008
JP 2009-015829 1/2009
JP 2009-048376 3/2009
JP 2009-258799 11/2009
JP 2010-009161 1/2010
WO WO 2007/142980 12/2007
WO WO 2009/026320 2/2009
WO WO 2012/112602 8/2012

OTHER PUBLICATIONS

EZ Pay® Ticketing Advertisement, written by IGT, published in 2013 (1 page).
IGT Advantage® sb NexGen® II Advertisement, written by IGT, published in 2010 (2 pages).
"JCM Global, Techfirm Inc. and NRT Technology Corp. to Present First Fully Integrated NFC-Based Interactive Mobile Wager Network That Connects Player, Mobile Wager Wallet, QuickJackTM ATM and Gaming Device" online article published Oct. 1, 2012, retrieved from http://finance.yahoo.com/news/jcm-global-techfirm-inc-nrt-150000276.html (5 pages).
State of Nevada Gaming Control board Minimum Internal Control Standards, Version 7 dated Oct. 1, 2014, paragraphs 31-57.
Australian Examination Report No. 1 for Application No. 2018267567 dated Aug. 14, 2023 (3 pages).

* cited by examiner

1000

SYSTEM AND METHOD EMPLOYING VIRTUAL TICKETS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager. Generally, symbols or symbol combinations which are less likely to occur provide higher awards.

SUMMARY

In certain embodiments, the present disclosure relates to a virtual ticket audit device including a support structure configured to be supported by a housing of an electronic gaming machine, a processor supported by the support structure, and a memory device supported by the support structure and which stores a plurality of instructions. When executed by the processor, the instructions cause the processor to receive first data associated with a virtual ticket voucher accessible via a mobile device application of a mobile device, said virtual ticket voucher associated with a value, store virtual ticket voucher information associated with the virtual ticket voucher, wherein the stored virtual ticket voucher information is subsequently used in association with an accounting of activity of the electronic gaming machine, and communicate the first data associated with the virtual ticket voucher to the electronic gaming machine, wherein the electronic gaming machine modifies a credit balance of the electronic gaming machine based on the value associated with the virtual ticket voucher.

In certain embodiments, the present disclosure relates to a virtual ticket audit device including a support structure configured to be supported by a housing of an electronic gaming machine, a processor supported by the support structure, and a memory device supported by the support structure and which stores a plurality of instructions. When executed by the processor responsive to an input being made to cashout a credit balance of the electronic gaming machine, the instructions cause the processor to receive first data associated with a virtual ticket voucher from the electronic gaming machine, said virtual ticket voucher having a value based on the cashed out credit balance of the electronic gaming machine. When executed by the processor, the instructions also cause the processor to store virtual ticket voucher information associated with the virtual ticket voucher and communicate the first data associated with the virtual ticket voucher to a mobile device, wherein the stored virtual ticket voucher information is subsequently used in association with an accounting of activity of the electronic gaming machine.

Additional features and advantages are described herein, and will be apparent from the following Detailed Description and the figures.

DETAILED DESCRIPTION

Figure 1A:
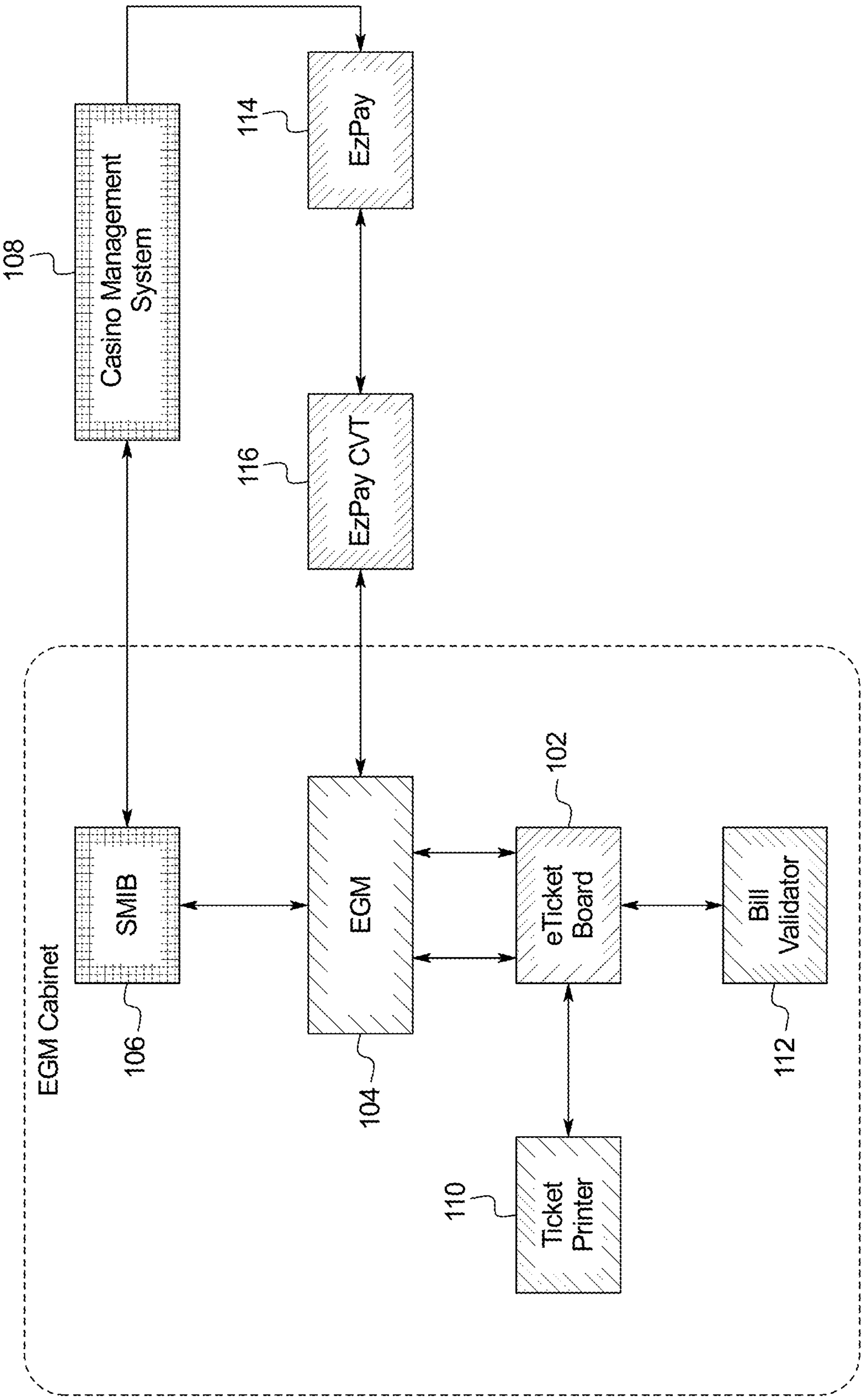
FIG. 1A is an example schematic configuration of the architecture of a plurality of different components of the system which facilitate the movement of funds via virtual ticket vouchers.

In various embodiments, the system disclosed herein utilizes a virtual ticket audit device to account for the transfer of virtual ticket vouchers between different components of a gaming establishment ecosystem.

In certain embodiments, the system enables a player to utilize an application running on a mobile device (and without utilizing any physical forms of currency or physical ticket vouchers associated with any forms of currency) to transfer data associated with one or more virtual ticket vouchers from a gaming establishment system, such as from a ticketing system, to establish a credit balance for game play on an electronic gaming machine ("EGM") and/or to fund other wagering opportunities (e.g., placing a wager on a sporting event either at or remote from an EGM). In these embodiments, the system employs a component of the gaming establishment system, such as a virtual ticket audit device (i.e., a virtual ticket board or an electronic ticket board) which is part of the ticketing system, to communicate with the mobile device and the EGM to facilitate a transfer of data representative of a transfer of funds via a virtual ticket voucher. That is, the virtual ticket audit device interacts with the application running on the mobile device to receive data regarding which virtual ticket vouchers are to be redeemed and following the verification that such virtual ticket vouchers are valid and the storage of virtual ticket voucher information, the virtual ticket audit device interacts with the EGM (similar to how a bill validator interacts with an EGM when a physical ticket voucher is presented to the bill validator) to establish a credit balance on the EGM. It should be appreciated that unlike certain systems which enable the redemption of virtual ticket vouchers via the exchange of virtual ticket voucher information between a mobile device and an EGM, the system disclosed herein enables the redemption of virtual ticket vouchers via the exchange of virtual ticket voucher information between a mobile device and the virtual ticket audit device followed by the exchange of virtual ticket voucher information between the virtual ticket audit device and the EGM.

In certain embodiments, in addition to or alternative from the virtual ticket audit device operating with the mobile device and the EGM to facilitate a transfer of virtual ticket vouchers from an account associated with the player to an EGM, the system employs a component of the gaming establishment system, such as the virtual ticket audit device, to communicate with the mobile device and the EGM to facilitate a transfer of data representative of a transfer of funds via a virtual ticket voucher from the EGM to an account associated with the player (which is accessible via the mobile device application). That is, following an input by the player to cashout a credit balance of the EGM, the virtual ticket audit device interacts with the EGM (similar to how a ticket printer interacts with an EGM when a cashout input is received) to facilitate the creation of a virtual ticket voucher. Following the storage of virtual ticket voucher information associated with the created virtual ticket voucher, the virtual ticket audit device transmits the virtual ticket voucher information to a mobile device (where the virtual ticket voucher is stored until a subsequent redemption). It should be appreciated that unlike certain systems which enable the issuance of virtual ticket vouchers via the exchange of virtual ticket voucher information between an EGM and a mobile device, the system disclosed herein enables the issuance of virtual ticket vouchers via the exchange of virtual ticket voucher information between an EGM and the virtual ticket audit device followed by the exchange of virtual ticket voucher information between the virtual ticket audit device and the mobile device.

In these embodiments, in addition to or alternative from the virtual ticket audit device operating with the mobile device and the EGM to facilitate a transfer of virtual ticket vouchers from an account associated with the player to an EGM and/or the virtual ticket audit device operating with the mobile device and the EGM to facilitate a transfer of virtual ticket vouchers from the EGM to an account associated with the player, as mentioned above, the virtual ticket audit device stores various virtual ticket voucher information or data associated with one or more of these transfers. Such stored data is subsequently accessed in association with an accounting of the virtual ticket vouchers to maintain accurate metering of the system. That is, unlike physical forms of currency and physical ticket vouchers associated with forms of currency which can be physically counted by gaming establishment personnel, since virtual ticket vouchers associated with forms of currency cannot be physically counted by gaming establishment personnel, the virtual ticket audit device of the present disclosure tracks the transfers of such virtual ticket vouchers which otherwise would be physically unaccounted for.

More specifically, in certain known gaming establishments which utilize physical ticket vouchers, the gaming establishment's daily audit/drop process begins by having a "drop team" (i.e., one or more gaming establishment personnel) go to each EGM on the gaming establishment floor, open the main door of the EGM and collect the bill validator's drop box (i.e., a secure tamper resistant container in which currency, gaming vouchers, coupons and Board-approved instruments inserted into the bill validator are deposited) inside the EGM. The "drop team" replaces the collected drop box with an empty drop box. At the same time, when the main door of the EGM is opened to collect the drop box, the gaming establishment's accounting system snapshots the various EGM's meters, such as over a Slot Accounting System ("SAS") protocol, a Game to System ("G2S") protocol, or any other appropriate EGM to system protocol). In these known systems, once the bill validator drop boxes across the gaming establishment floor have been collected, the collected bill validator drop boxes are taken to the gaming establishment's count room which is responsible for counting the physical forms of currency and physical ticket vouchers associated with forms of currency obtained for each EGM. In the case of physical forms of currency, such as bills, the personnel in the count room track the dollar amount collected from each EGM in each denomination (# of $20 bills, # of $10 bills, etc). In the case of physical tickets, the personnel in the count room track the amount of each ticket and the validation number. Information from the count process is then transferred to the slot accounting system, which compares meter movement between drops to the amount of physical forms of currency and physical ticket vouchers obtained from the bill validator's drop box by the count room. This comparison is then utilized by the gaming establishment and/or regulators to confirm that nobody is improperly skimming or stealing money.

As can be appreciated, the use of virtual ticket vouchers upsets this process because no physical ticket vouchers will be obtained from the bill validator's drop box for virtual ticket vouchers redeemed at an EGM. Therefore, prior to the present disclosure, the gaming establishment and regulators had no way or limited ways to audit the EGM's meters against all money movement that occurred. As such, by employing the virtual ticket audit device of the present disclosure, the gaming establishment and regulators now have the ability to track the transfers of virtual ticket vouchers thereby ensuring that such tracked virtual ticket voucher transfers are included in the information from the count process (which is transferred to the slot accounting system and compared against meter movement between drops). Accordingly, the virtual ticket audit device of the present disclosure provides a retrofit device which enables the gaming establishment and regulators to have a complete picture of the funds associated with wagering/winnings such that a proper comparison of this complete fund data can be utilized by the gaming establishment and/or regulators to confirm that the EGMs are being operated in compliance with various gaming regulations as well as tax regulations.

Accordingly, in overcoming the various security concerns and labor cost concerns associated with both cash-based gaming and ticket voucher-based gaming, the system disclosed herein encourages the use of mobile devices to facilitate fund transfers using virtual ticket vouchers while providing a way for the gaming establishment operator and gaming regulators to audit the EGM's meters against all fund movement that may occur. Such a configuration further reduces the use of paper ticket vouchers (and any ink associated with the production of such paper ticket vouchers) to reduce the amount of waste produced by gaming establishments, thus providing an environmental benefit of implementing the system disclosed herein.

Linking Mobile Device to Virtual Ticket Audit Device

In various embodiments, prior to enabling a player to take any action related to virtual ticket vouchers utilizing a mobile device (such as using a mobile device to redeem a virtual ticket voucher to establish an amount of funds on an EGM), a pairing or linkage occurs between the mobile device and the virtual ticket audit device (or a component of a gaming establishment ticketing system located inside/supported by the EGM (i.e., a component of the EGM)). The pairing or linkage between the mobile device and the virtual ticket audit device occurs via one or more applications being run or executed on the mobile device.

In certain embodiments, the mobile device application utilized to transfer virtual ticket voucher information to and from a virtual ticket audit device is a location based digital wallet enabled application, such as a Passbook-enabled or Wallet-enabled application, which is accessible when the player enters a gaming establishment. In certain embodiments, the mobile device application utilized to transfer virtual ticket voucher information to and from a virtual ticket audit device is downloaded to the mobile device from an application store. In certain embodiments, the mobile device application utilized is downloaded to the mobile device from one or more websites affiliated with the gaming establishment (which are accessible directly by the player and/or by a link opened when the player scans a QR code associated with the EGM).

In certain embodiments, after a player has opened an application on a mobile device and selected one or more virtual ticket vouchers to be used to establish a credit balance on the EGM, the system determines if the mobile device application is associated with an active authorization token previously created by the system. In certain embodiments, after a player has made an input to cashout a credit balance of an EGM (and, if necessary, opened an application on a mobile device), the system determines if the mobile device application is associated with an active authorization token previously created by the system.

In these embodiments, an authorization token is a time-based token which expires after a designated period of time and which is associated with an additional level of player authentication beyond a player's application username and application password. A further explanation regarding authorization tokens and utilizing authorization tokens to establish communication sessions can be found in U.S. Published Patent Application No. 2017/0092054 entitled: "GAMING SYSTEM AND METHOD FOR UTILIZING A MOBILE DEVICE TO FUND A GAMING SESSION", the entire contents of which is incorporated herein by reference.

Following a determination that the mobile device application is associated with a newly created authentication token or a previously created and stored authentication token, the mobile device application prompts the player to cause the mobile device to engage the EGM, such as prompting the player to tap the mobile device to a designated portion of the EGM (or otherwise moving the mobile device to within a designated distance of a bill validator, a player tracking card reader or other designated locations(s) of the EGM). It should be appreciated that while the authorization token represents an additional level of player authentication, the transfer of virtual ticket voucher information as disclosed herein may occur without the use of such authorization tokens.

Following the player causing the mobile device to engage the EGM, the mobile device application communicates, via a wireless communication protocol, the authorization token (if any) and virtual ticket voucher information associated with the one or more virtual ticket vouchers to the virtual ticket audit device (or to a component associated with the EGM, such as a component of the gaming establishment ticketing system).

Utilizing Paired Mobile Device Application

In various embodiments, after pairing the mobile device with the virtual ticket audit device (or a component of the gaming establishment ticketing system supported by the EGM), the mobile device application communicates one or more requested actions to be performed to the virtual ticket audit device. It should be appreciated that while certain data or information pertaining to one or more of the requested actions are communicated between a virtual ticket audit device (or a component of an EGM, such as a component of a gaming establishment ticketing system supported by or otherwise located inside the EGM) and a mobile device, such data or information may additionally or alternatively be communicated: (i) between one or more servers and a mobile device via one or more wireless communication protocols, or (ii) between the virtual ticket audit device and one or more servers via one or more wireless communication protocols and further between one or more servers and a mobile device via one or more wireless communication protocols.

It should additionally be appreciated that the mobile device facilitated virtual ticket voucher transfers of the present disclosure may occur in addition to or as an alternative from cash-based fund transfers and/or ticket voucher-based fund transfers. In different embodiments, a credit balance of an EGM of the present disclosure is funded by one or more of: any virtual ticket voucher-based fund transfer, any mobile device facilitated fund transfer, any cash-based fund transfer, and/or any ticket voucher-based fund transfer. In another embodiment, a credit balance of an EGM of the present disclosure is cashed out via one or more of any virtual ticket voucher-based fund transfer, any mobile device facilitated fund transfer, any cash-based fund transfer, and/or any ticket voucher-based fund transfer. Additional details regarding mobile device facilitated fund transfers are further explained in U.S. Published Patent Application No. 2017/0092054 (which, as mentioned above, incorporated by reference in its entirety).

It should be further appreciated that any functionality or process described herein may be implemented via one or more servers, an EGM, one or more components of an EGM (such as a component of a gaming establishment management system (e.g., a player tracking unit) or a component of a gaming establishment ticketing system supported by or otherwise located inside the EGM), or a mobile device application. For example, while certain data or information described herein is explained as being communicated from a virtual ticket audit device or a component of an EGM (such as a component of a gaming establishment ticketing system) supported by or otherwise located inside the EGM) to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a virtual ticket audit device (or another component of a gaming establishment ticketing system supported by or otherwise located inside the EGM), such functions, features or processes may alternatively be performed by any combination of one or more of: one or more servers, one or more mobile device applications, one or more EGMs, and/or one or more components of an EGM (such as a component of a gaming establishment management system supported by or otherwise located inside the EGM), (ii) while certain functions, features or processes are described herein as being performed by one or more mobile device applications, such functions, features or processes may alternatively be performed by any combination of one or more of: one or more servers, one or more virtual ticket audit devices (or a component of a gaming establishment ticketing system supported by or otherwise located inside the EGM), one or more EGMs, and/or one or more components of the EGM (such as a component of a gaming establishment management system supported by or otherwise located inside the EGM), (iii) while certain functions, features or processes are described herein as being performed by one or more servers, such functions, features or processes may alternatively be performed by any combination of one or more of: one or more EGMs, one or more virtual ticket audit devices, one or more mobile device applications, and/or one or more components of the EGM (such as a component of a gaming establishment management system supported by or otherwise located inside the EGM), and (iv) while certain functions, features or processes are described herein as being performed by one or more components of an EGM (such as a component of a gaming establishment management system or a component of a gaming establishment ticketing system supported by or otherwise located inside the EGM), such functions, features or processes may alternatively be performed by any combination of one or more of: one or more EGMs, one or more mobile device applications, one or more virtual ticket audit devices, and/or one or more servers.

Transfer of Virtual Ticket Vouchers

In certain embodiments, the action to be performed includes enabling the player to transfer funds, via one or more virtual ticket vouchers, to the EGM utilizing the mobile device application and the virtual ticket audit device. It should be appreciated that while described below in relation to transferring an amount of funds associated with a virtual ticket voucher to an EGM utilizing the mobile device application and a virtual ticket audit device, such a transfer of an amount of funds associated with one or more virtual ticket vouchers may also be transferred to a kiosk and/or a gaming establishment interface (utilizing the mobile device application and a virtual ticket audit device associated with such a kiosk and/or such a gaming establishment interface) to convert the virtual ticket vouchers to an amount of funds available for the player. Detailed examples of virtual ticket vouchers and wireless communication protocols associated with such virtual ticket vouchers are described in: (i) U.S. Published Patent Application No. 2013/0023339, entitled "METHODS AND APPARATUS FOR PROVIDING SECURE LOGON TO A GAMING MACHINE USING A MOBILE DEVICE"; (ii) U.S. Published Patent Application No. 2014/0162768, entitled "METHODS AND APPARATUS FOR PROVIDING SECURE LOGON TO A GAMING MACHINE USING A MOBILE DEVICE"; (iii) U.S. Pat. No. 8,956,222, entitled "MOBILE DEVICE INTERFACES AT AN ELECTRONIC GAMING MACHINE"; (iv) U.S. Published Patent Application No. 2013/0260889, entitled "EMAILING OR TEXTING AS COMMUNICATION BETWEEN MOBILE DEVICE AND EGM"; (v) U.S. Published Patent Application No. 2013/0065668, entitled "REDEMPTION OF VIRTUAL TICKETS USING A PORTABLE ELECTRONIC DEVICE"; (vi) U.S. Patent No. 2014/0121005, entitled "VIRTUAL TICKET-IN AND TICKET-OUT ON A GAMING MACHINE"; (vii) U.S. Published Patent Application No. 2013/0065678, entitled "RETROFIT DEVICES FOR PROVIDING VIRTUAL TICKET-IN AND TICKET-OUT ON A GAMING MACHINE"; (viii) U.S. Published Patent Application No. 2013/0065686, entitled "BILL ACCEPTORS AND PRINTERS FOR PROVIDING VIRTUAL TICKET-IN AND TICKET-OUT ON A GAMING MACHINE"; (ix) U.S. Pat. No. 8,961,306, entitled "FEEDBACK TO PLAYER OF DEVICE CONNECTION STATE"; (x) U.S. Pat. No. 8,613,668, entitled "DIRECTIONAL WIRELESS COMMUNICATION"; (xi) U.S. Published Patent Application No. 2013/0316808, entitled "METHOD AND APPARATUS FOR ENTERING SENSITIVE DATA FOR AN ELECTRONIC GAMING MACHINE FROM A PORTABLE ELECTRONIC DEVICE"; (xii) U.S. Pat. No. 8,622,836, entitled "USE OF WIRELESS SIGNAL STRENGTH TO DETERMINE CONNECTION"; and (xiii) U.S. Published Patent Application No. 2014/0248941, entitled "TRANSFER VERIFICATION OF MOBILE PAYMENTS"; the entire contents of each of which are incorporated herein by reference.

Figure 2:
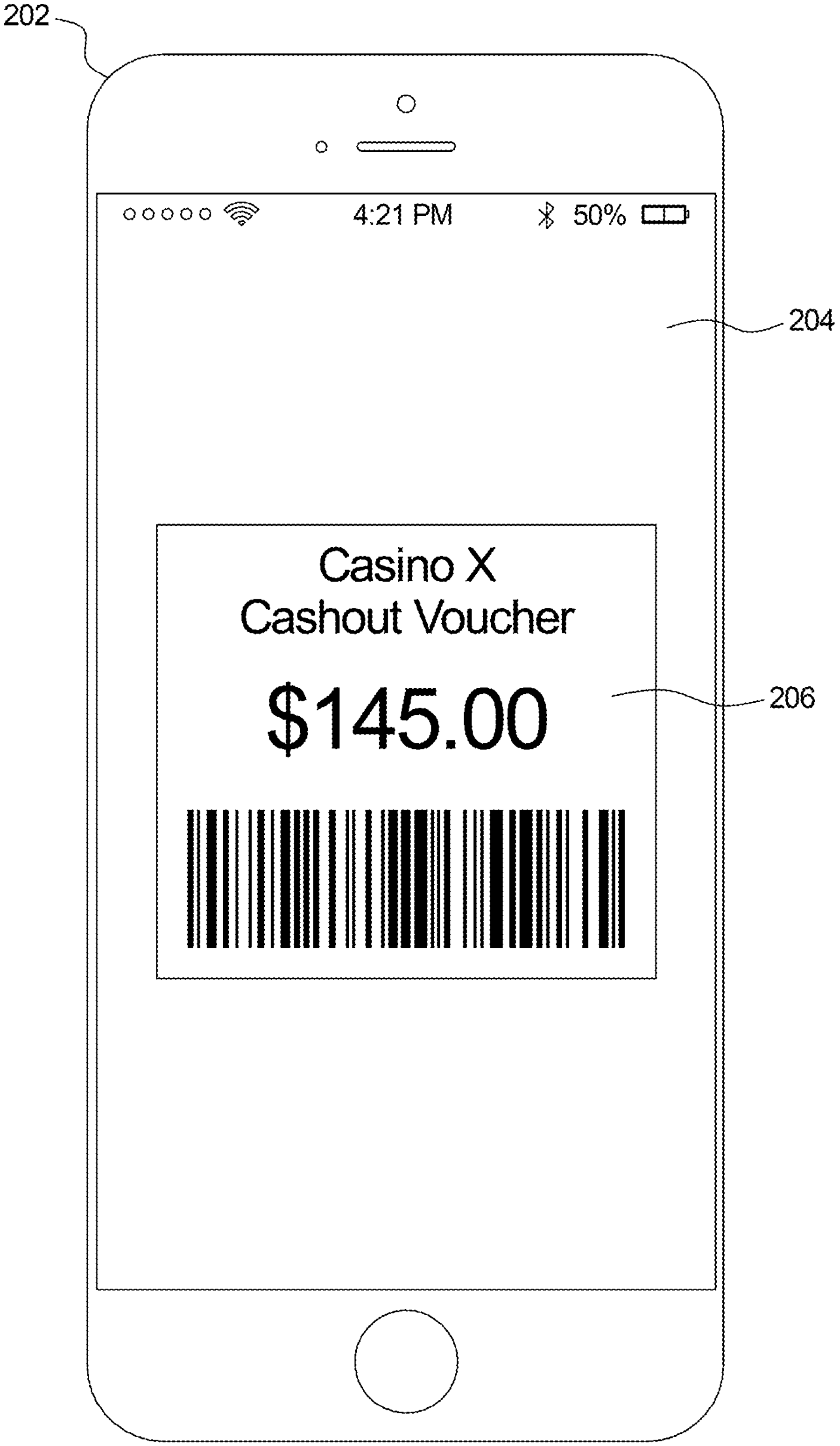
FIG. 2 is an example graphical user interface displayed on a mobile device in connection with a virtual ticket voucher.

In certain embodiments, following the launching of the mobile device application, such as following the player selecting an image associated with an electronic casino loyalty account card stored via a digital wallet application, the mobile device application determines an amount of funds to be transferred to the EGM via the redemption of a virtual ticket voucher. In these embodiments, the mobile device application displays to the player images representing any virtual ticket vouchers associated with the mobile device. For example, as seen in FIG. 2, the mobile device application 202 of the mobile device 204 displays to the player that one virtual ticket voucher 206 having a value of $145.00 is currently associated with the mobile device. The mobile device application enables the player to select one or more images representing one or more virtual ticket vouchers associated with the mobile device. In these embodiments, following the determination of which virtual ticket vouchers are to be transferred from the mobile device application to the EGM, the mobile device application prompts the player to cause the mobile device to engage the EGM. The mobile device application then communicates, via a wireless communication protocol, data associated with the selected virtual ticket voucher to be transferred to the virtual ticket audit device. In certain embodiments, the virtual ticket audit device communicates data to the EGM, such that the EGM functions as if a virtual ticket were inserted into the bill validator of the EGM. In these embodiments, upon the EGM determining that a virtual ticket were inserted, the EGM communicates with the ticketing system (or a slot machine interface board ("SMIB") which in turn will communicate with the ticketing system), to redeem the voucher via requesting the selected virtual ticket voucher (and more specifically the amount of funds associated with the selected virtual ticket voucher) be transferred to the EGM. In certain other embodiments, the virtual ticket audit device communicates data to one or more servers, such as a virtual ticket voucher server or other server associated with the ticketing system, to request the selected virtual ticket voucher (and more specifically the amount of funds associated with the selected virtual ticket voucher) be transferred to the EGM. In these embodiments, in association with the redemption of a virtual ticket voucher, the server determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the EGM proceeds with updating a credit balance of the EGM to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain other embodiments, following a full or partial depletion of a credit balance of the EGM, the EGM wirelessly communicates with the virtual ticket audit device which wirelessly communicates with the mobile device and queries the mobile device for the presence of any additional virtual ticket vouchers associated with the mobile device application. That is, when the credit balance of the EGM is empty, when the credit balance of the EGM has less than an amount of credits to repeat a previous wager, when the credit balance of the EGM has less credits than a minimum wager and/or when the credit balance of the EGM is below a designated threshold amount, the EGM communicates, through the virtual ticket audit device, with the mobile device to determine if the mobile device application is associated with any additional available virtual ticket vouchers. If no additional virtual ticket vouchers are available, the EGM prompts the player to fund the credit balance of the EGM via another funding avenue, such as any mobile device facilitated fund transfer, any cash-based fund transfer, and/or any ticket voucher-based fund transfer. On the other hand, if at least one virtual ticket voucher is available, the EGM operates with the mobile device, via the virtual ticket audit device, to facilitate the transfer of such at least one virtual ticket voucher to the EGM. In one such embodiment, the mobile device application communicates a listing of available virtual ticket vouchers to the virtual ticket audit device which communicates this listing to the EGM. The EGM proceeds with displaying the listing of available virtual ticket vouchers and enables the player to select one or more of the available virtual ticket vouchers to redeem. If the player selects one or more of the available virtual ticket vouchers, the EGM communicates the player's selection to the virtual ticket audit device which communicates the player's selection to the mobile device and the mobile device application proceeds with facilitating the transfer of such virtual ticket vouchers to the virtual ticket audit device and then to the EGM as described herein. It should be appreciated that this embodiment enables a player to utilize a mobile device to facilitate the transfer funds, such as transfer of funds associated with one or more virtual ticket vouchers associated with the mobile device, without having to reengage the EGM with the mobile device.

In certain other embodiments, following a full or partial depletion of a credit balance of the EGM, the EGM wirelessly communicates with the mobile device (or communicates with one or more server which communicate with the EGM) and queries the mobile device for the presence of any additional virtual ticket vouchers associated with the mobile device application. If no additional virtual ticket vouchers are available, the EGM prompts the player to fund the credit balance of the EGM via another funding avenue, such as any mobile device facilitated fund transfer, any cash-based fund transfer, and/or any ticket voucher-based fund transfer. On the other hand, if at least one virtual ticket voucher is available, the mobile device application proceeds with facilitating the automatic transfer of the at least one virtual ticket voucher to the EGM. It should be appreciated that this embodiment enables a player to automatically transfer funds, such as transfer of funds associated with one or more virtual ticket vouchers associated with the mobile device, via the mobile device without the player having to reengage the EGM with the mobile device and without the player having to prompt either the EGM or the mobile device application to initiate such a transfer. It should be further appreciated that, in certain embodiments, the gaming system enables the player to enable or disable such an automatic "transfer of virtual ticket vouchers" feature.

In another embodiment, the EGM periodically communicates information to the virtual ticket audit device which communicates the information to the mobile device regarding the status or amount of the credit balance of the EGM. In one such embodiment, based on this communicated information, the mobile device application determines when to alert the player to potentially transfer additional funds to the EGM via the virtual ticket audit device and utilizing the mobile device application. For example, the mobile device application could vibrate the mobile device, or create a sound, which alerts the player to view the mobile device application and select which additional funds to virtually insert into or load on the EGM via communicating virtual ticket voucher information to the virtual ticket audit device. In another such embodiment, based on this communicated information, the mobile device application determines when to automatically transfer one or more additional and available virtual ticket vouchers to the virtual ticket audit device which then communicates virtual ticket voucher information to the EGM.

In certain embodiments, the action to be performed additionally or alternatively includes enabling the player to transfer funds from an EGM to the virtual ticket audit device and then to a mobile device facilitated by the mobile device application. That is, the system of this disclosure enables a player to transfer winnings (or other unused funds) from the EGM to a mobile device in association with the virtual ticket audit device and the mobile device application. In certain such embodiments, following the launching of the mobile device application, such as following the player selecting an image associated with an electronic casino loyalty account card stored via a digital wallet application or following the mobile device application retrieving data associated with a player account stored via a digital wallet application, and receiving one or more "cash out" inputs from the player, the mobile device application determines an amount of funds to be transferred from the EGM.

In one embodiment, the mobile device application enables the player to select an amount to be transferred from the EGM. In one such embodiment, the mobile device application enables the player to select a portion of the credit balance of the EGM (i.e., less than the entire credit balance) to be transferred from the EGM. In various examples, the mobile device application automatically selects an amount of any winnings (i.e., an amount of the credit balance over the initial credit balance), an amount of winnings over a designated amount, an amount of a last win (i.e., an award amount associated with the last played game) or an amount of a last win over a designated amount (i.e., an award amount associated with the last played game over a designated award amount) to be transferred from the EGM. In another embodiment, the mobile device application determines to transfer the credit balance of the EGM from the EGM.

In certain embodiments, following the determination of an amount of funds to be transferred from the EGM, the mobile device application prompts the player to cause the mobile device to engage the virtual ticket audit device, such as prompting the player to tap the mobile device to a player tracking card reader or other designated location(s) of the EGM associated with the virtual ticket audit device.

In certain other embodiments, the system determines to facilitate the transfer of cashable funds from the EGM independent of any input by the player and/or independent of any engagement between the mobile device and the virtual ticket audit device. In one such embodiment, if the system determines that no activity has occurred for a designated amount of time, as a precautionary measure, the virtual ticket audit device transfers, in the form of virtual ticket vouchers, the credit balance of the EGM to the mobile device. In another embodiment, if the system determines that another player is attempting to establish a wireless connection with the virtual ticket audit device, as a precautionary measure, the virtual ticket audit device transfers, in the form of virtual ticket vouchers, the credit balance of the EGM to the mobile device. Such transfers of the credit balance are associated with a termination of the player's current gaming session.

After any engagement between the mobile device and the virtual ticket audit device (or after the determination of an amount of funds to be transferred if no mobile device to virtual ticket audit device engagement is required), the mobile device application communicates, via a wireless communication protocol, data associated with the determined amount of cashable funds to be transferred from the EGM. The EGM, in conjunction with the virtual ticket audit device, proceeds with operating with a gaming establishment ticketing system to create a virtual ticket voucher associated with the determined amount of funds. Virtual ticket voucher information associated with the created virtual ticket voucher is transferred, via a suitable wired or wireless protocol, from the EGM to the virtual ticket audit device. Such virtual ticket voucher information associated with the created virtual ticket voucher is then transferred, via a suitable wireless protocol, from the virtual ticket audit device to the mobile device. In certain embodiments, the EGM further proceeds with communicating a virtual ticket voucher creation confirmation to the virtual ticket audit device which communicates the conformation to the mobile device, wherein the mobile device application displays such a confirmation and/or the updated credit balance of the EGM. The mobile device then stores the created virtual ticket voucher which is available to be transferred to another EGM or a kiosk for redemption.

In certain embodiments, the system enables a player to interact with the virtual ticket audit device via the mobile device without having to continually reengage the EGM (or a component of the EGM, such as a component of the gaming establishment ticketing system supported by the EGM) with the mobile device for each requested action. In these embodiments, after initially establishing a secure connection with the virtual ticket audit device, subsequent interactions between the mobile device application and the virtual ticket audit device occur without any subsequent physical interaction between the mobile device and the EGM which houses the virtual ticket audit device. That is, to avoid having the player retrieve the mobile device and repeat the physical operation of engaging the EGM (or a component of the EGM, such as a component of the gaming establishment ticketing system supported by the EGM) with the mobile device, certain embodiments enable the player to execute one or more functions without repeating the above-described physical operation of engaging the EGM with the mobile device. In certain such embodiments, the mobile device application utilizes one or more display devices of the EGM and/or the virtual ticket audit device to display to the player information and/or player selectable prompts which are otherwise displayable via the display device of the mobile device.

In certain other embodiments, for each interaction or requested action between the virtual ticket audit device and the mobile device, the system requires the player to reengage the EGM (or a component of the EGM, such as a component of the gaming establishment ticketing system supported by the EGM) with the mobile device to reestablish or confirm the pairing between the virtual ticket audit device and the mobile device. In certain other embodiments, for each interaction between the virtual ticket audit device and the mobile device that occur a designated amount of time after the last engagement of the EGM (which houses the virtual ticket audit device) with the mobile device, the system requires the player to reengage the EGM with the mobile device to reestablish or confirm the pairing between the virtual ticket audit device and the mobile device.

In certain embodiments, the action to be performed additionally or alternatively includes automatically transferring funds from the EGM to a mobile device, in the form of virtual ticket vouchers utilizing the virtual ticket audit device and the mobile device application. In one such embodiment, the gaming system includes an automatic "cash out" feature wherein if a credit balance of the EGM reaches above a threshold level, the mobile device automatically initiates a transfer of an amount of funds from the EGM in the form of virtual ticket vouchers. Such an automatic "cash out" feature is associated with a termination of the player's current gaming session. It should be appreciated that, in certain embodiments, the gaming system enables the player to enable or disable such an automatic "cash out" feature.

It should be appreciated that the mobile device facilitated fund data transfers of the present disclosure may occur in addition to or as an alternative from cash-based fund transfers and/or ticket voucher-based fund transfers. In one such embodiment, an EGM of the present disclosure is funded via any of a mobile device facilitated fund transfer, a cash-based fund transfer or a ticket voucher-based fund transfer. In another embodiment, a credit balance of an EGM of the present disclosure is cashed out via any of a mobile device facilitated fund transfer, a cash-based fund transfer or a ticket voucher-based fund transfer. In another embodiment, an EGM of the present disclosure is funded via a mobile device facilitated fund transfer or a cash-based fund transfer (but is not funded via any ticket voucher-based fund transfer). In another embodiment, a credit balance of an EGM of the present disclosure is cashed out via a mobile device facilitated fund transfer or a cash-based fund transfer (but is not cashed out via any ticket voucher-based fund transfer). In another embodiment, an EGM of the present disclosure is funded via a mobile device facilitated fund transfer or a ticket voucher-based fund transfer (but is not funded via any cash-based fund transfer). In another embodiment, a credit balance of an EGM of the present disclosure is cashed out via a mobile device facilitated fund transfer or a ticket voucher-based fund transfer (but is not cashed out via any cash-based fund transfer). In another embodiment, an EGM of the present disclosure is funded via a mobile device facilitated fund transfer (but is not funded via a cash-based fund transfer nor a ticket voucher-based fund transfer). In another embodiment, a credit balance of an EGM of the present disclosure is cashed out via a mobile device facilitated fund transfer (but is not cashed out via a cash-based fund transfer nor a ticket voucher-based fund transfer).

In certain embodiments, the action to be performed additionally or alternatively includes transferring promotional funds from a player account to the EGM utilizing the mobile device application and the virtual ticket audit device. In certain such embodiments, rather than utilizing physical promotional tickets (i.e., an instrument associated with a quantity of promotional credits redeemable for game play on EGM, but not otherwise redeemable for cash) which represent promotional credits, the system utilizes an electronic or virtual ticket to represent promotional funds. In other such embodiments, rather than a player redeeming a physical promotional ticket at a kiosk or player services desk to cause an amount of promotional credits associated with the physical promotional ticket to be associated with a player tracking account, the system utilizes the mobile device application and the virtual ticket audit device to redeem such promotional credits.

In certain embodiments, to obtain promotional funds, such as one or more electronic or virtual promotional tickets, a gaming establishment communicates data associated with promotional funds, such as an electronic or virtual promotional ticket, to the mobile device application (or a server maintained account associated with the mobile device application). It should be appreciated that data associated with promotional funds, such as one or more electronic promotional tickets, could be communicated to the mobile devices of a plurality of players (e.g., a gaming establishment communicates to each player with a registered mobile device application a promotional ticket of promotional credits for free play of a new gaming machine the gaming establishment is currently promoting) and/or could be communicated to the mobile device of a particular player (e.g., a gaming establishment communicates to a promotional ticket of promotional credits to a valued player, wherein the promotional credits are redeemable for free play of any gaming machine in the gaming establishment).

In one such embodiment of communicating data associated with promotional funds, such as an electronic or virtual promotional ticket, to the mobile device application (or a server maintained account associated with the mobile device application), one or more servers, such as a gaming establishment promotional server, send a message, such as an email or text message, to a player. The message includes a hyperlink and/or an attachment associated with the promotional funds, such as an electronic promotional ticket. When the player accesses the hyperlink and/or attachment via the player's mobile device, the mobile device activates or launches the mobile device application and the associated promotional funds, such as the associated electronic promotional ticket, are transferred to the mobile device application (or a server maintained account associated with the mobile device application).

In another such embodiment of a gaming establishment communicating data associated with promotional funds, such as an electronic or virtual promotional ticket, to the mobile device application (or a server maintained account associated with the mobile device application), one or more servers, such as a gaming establishment promotional server, send a message, such as an email or text message, to a player. The message of this embodiment does not include any hyperlink or attachment associated with any promotional funds, such as any electronic promotional tickets and thus no promotional funds are transferred to the mobile device application via this message. Rather, the message of this embodiment notifies the player that an account associated with the player has been credited with promotional funds. Such a message could include information associated with the available promotional funds (e.g., an amount of promotional credits, a promotional fund identifier, and/or a time window which the promotional funds may be redeemed). In this embodiment, when the mobile device application is activated or launched by a player, the mobile device application queries one or more servers, such as a gaming establishment promotional server, for any promotional funds available to the player. In this embodiment, the one or more servers transfer data associated with any promotional funds available to the player to the mobile device application (or a server maintained account associated with the mobile device application).

In another such embodiment of communicating data associated with promotional funds, such as an electronic or virtual promotional ticket, to the mobile device application (or a server maintained account associated with the mobile device application), one or more servers, such as a gaming establishment promotional server, send a message to the mobile device application to associate the mobile device application with promotional funds, such as one or more electronic or virtual promotional tickets. Such a message could be sent via email, text, tcp/ip or other suitable networking technology that communicates the promotional funds, such as the electronic or virtual promotional ticket and/or information associated with the electronic promotional ticket (e.g., an amount of promotional credits, a promotional ticket identifier, and/or a time window which the electronic promotional ticket may be redeemed) to the mobile device application (or a server maintained account associated with the mobile device application).

In another such embodiment of communicating data associated with promotional funds, such as an electronic or virtual promotional ticket, to the mobile device application (or a server maintained account associated with the mobile device application), when the mobile device application is activated or launched by a player, the mobile device application queries one or more servers, such as a gaming establishment promotional server, for any promotional funds, such as any electronic or virtual promotional tickets, available to the player. That is, in certain embodiments, following the launching of the mobile device application, such as following the player selecting an image associated with an electronic casino loyalty account card stored via a digital wallet application or following the mobile device application retrieving data associated with a player account stored via a digital wallet application, the system determines if any promotional funds are to be transferred to the virtual ticket audit device facilitated by the mobile device application and then to the EGM for use. In this embodiment, if the server determines that promotional funds are available for the player, such as one or more electronic or virtual promotional tickets are available for the player and/or an amount of promotional funds are associated with the player's account, the server transfers data associated with any promotional funds available to the player to the mobile device application (or a server maintained account associated with the mobile device application).

In another such embodiment of communicating data associated with promotional funds, such as an electronic or virtual promotional ticket, to the mobile device application (or a server maintained account associated with the mobile device application), when the mobile device and/or mobile device application detects that the mobile device is located in a gaming establishment associated with the mobile device application, the mobile device application queries one or more servers, such as a gaming establishment promotional server, for any promotional funds, such as any electronic or virtual promotional tickets, available to the player and/or an amount of promotional funds associated with the player's account. In this embodiment, if the server determines that promotional funds are available for the player, such as one or more electronic or virtual promotional tickets are available and/or an amount of promotional funds are associated with the player's account, the server transfers data associated with any promotional funds available to the player to the mobile device application (or a server maintained account associated with the mobile device application).

It should be appreciated that in certain of these embodiments of communicating data associated with promotional funds, such as an electronic or virtual promotional ticket, to the mobile device application, the promotional funds, such as the electronic or virtual promotional tickets, are stored by the mobile device in association with the mobile device application. For example, data communicated to the mobile device application includes the electronic promotional ticket which is redeemable at the EGM via the mobile device application. In other embodiments of communicating data associated with promotional funds, such as an electronic or virtual promotional ticket, to the mobile device application, the promotional funds, such as the electronic or virtual promotional tickets, are stored by one or more servers, such as a gaming establishment promotional server, but viewable via the mobile device application. For example, the electronic promotional ticket reside on the server, such as a gaming establishment promotional server, and the data communicated to the mobile device application includes identifying information associated the electronic promotional ticket (e.g., an amount of promotional credits, a promotional ticket identifier, and/or a time window which the electronic promotional ticket may be redeemed). Accordingly, in each of these embodiments, the mobile device stores, in association with the mobile device application, data associated with promotional funds, such as one or more electronic promotional tickets, to replace the use of and certain downsides or disadvantages associated with paper promotional tickets.

Following the mobile device application obtaining data associated with promotional funds, such as an electronic or virtual promotional ticket, to the mobile device application, the promotional funds, such as the electronic or virtual promotional tickets, are accessible by the mobile device in association with the mobile device application. That is, as described above in relation to how virtual ticket vouchers are transferred from a mobile device to the virtual ticket audit device via the mobile device application and then to an EGM, promotional funds, such as one or more electronic promotional tickets (or promotional credits associated with such electronic promotional tickets), are viewable via the mobile device application and transferable from the mobile device to the virtual ticket audit device via the mobile device application and then to the EGM.

It should be appreciated that the utilization of a mobile device to transfer one or more of the above-described funds to the virtual ticket audit device and then to the EGM reduces the costs associated with utilizing cash, ticket vouchers and/or promotional tickets. For example, the utilization of cash and ticket vouchers is associated with the labor costs of having to periodically remove a cash box including received ticket vouchers and cash from the EGM, replace the removed cash box with an empty one and refill the blank ticket voucher stacks housed by the EGM. The utilization of such cash and ticket vouchers is further associated with the various labor costs of counting the cash and ticket vouchers removed from the EGM. Specifically, any removed cash is transported to a secure area where one or more individuals are involved in counting and recording the various sums of cash and/or ticket vouchers removed from each EGM. The cash amounts removed from each EGM are reconciled with other information sources, such as from hard meters on the EGM or data obtained from the virtual ticket audit device regarding any virtual ticket vouchers. The reconciliation process ensures the earnings from the EGM are properly taxed. Additionally, the utilization of promotional tickets is associated with the various costs of printing such promotional tickets, mailing such promotional tickets to players prior to such players visiting the gaming establishment and/or staffing a player service desk with personal to redeem such promotional tickets. The utilization of a wirelessly connected mobile device to facilitate one or more requested actions as described herein reduces or eliminates these various costs associated with utilizing cash, ticket vouchers and/or promotional tickets.

Virtual Ticket Audit Device

In various embodiments, as described above, the system includes a virtual ticket audit device configured to operate with a gaming establishment ticketing system and an EGM to facilitate the utilization of virtual ticket vouchers and additionally store information regarding the utilization of such virtual ticket vouchers.

Specifically, in various embodiments, the virtual ticket audit device includes a support structure or body that provides support for a plurality of the below-described components of the virtual ticket audit device. When installed in an EGM, the support structure or body is supported by the cabinet of the EGM and/or the housing of a player tracking unit.

In certain embodiment, the virtual ticket audit device includes at least one controller configured to communicate with and to operate with a plurality of virtual ticket audit device peripheral devices and interfaces. The controller includes at least one processor. The at least one processor is any suitable processing device or set of processing devices, such as a microprocessor, a microcontroller-based platform, a suitable integrated circuit, or one or more application-specific integrated circuits configured to execute software enabling various configuration and reconfiguration tasks, such as: (1) communicating with a remote source via a communication interface of the controller; (2) converting signals read by an interface to a format corresponding to that used by software or memory of the virtual ticket audit device; (3) accessing memory to configure or reconfigure parameters in at least one memory; (4) communicating with interfaces and peripheral devices; and/or (5) controlling interfaces and peripheral devices.

The controller also includes at least one memory device, which includes one or more of: (1) volatile memory (e.g., RAM, which can include non-volatile RAM, magnetic RAM, ferroelectric RAM, and any other suitable forms); (2) non-volatile memory (e.g., disk memory, FLASH memory, EPROMs, EEPROMs, memristor-based non-volatile solid-state memory, etc.); (3) unalterable memory (e.g., EPROMs); (4) read-only memory; and/or (5) a secondary memory storage device, such as a non-volatile memory device. In certain embodiments, the controller is operable to write one or more files to a portable memory device, such as a USB thumb drive, which is insertable into a port of the virtual ticket audit device and further operable to be housed in a compartment of the support structure of the virtual ticket audit device. Any other suitable magnetic, optical, and/or semiconductor memory may operate in conjunction with the virtual ticket audit device disclosed herein.

The at least one memory device is configured to store, for example: (1) configuration software; (2) communication protocols configured to enable the at least one processor of the virtual ticket audit device to communicate with the virtual ticket audit device peripheral devices and interfaces; and/or (3) communication transport protocols (such as, but not limited to, TCP/IP, USB, Firewire, IEEE1394, Bluetooth, BLE, IEEE 802.11x (IEEE 802.11 standards), hiperlan/2, HomeRF, etc.) configured to enable the virtual ticket audit device to communicate with local and non-local devices using such protocols. In one implementation, the controller communicates with other devices using a serial communication protocol.

In certain embodiments, the at least one memory device is configured to store program code and instructions executable by the at least one processor of the virtual ticket audit device to control the virtual ticket audit device. In various embodiments, part or all of the program code and/or the operating data described herein is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) uses such a removable memory device to implement at least part of the present disclosure. In other embodiments, part or all of the program code and/or the operating data is downloaded to the at least one memory device of the virtual ticket audit device through any suitable data network described above (such as an Internet or intranet).

The at least one memory device also stores a plurality of device drivers. Examples of different types of device drivers include device drivers for virtual ticket audit device components and device drivers for the virtual ticket audit device peripheral components. Typically, the device drivers utilize various communication protocols that enable communication with a particular physical device. The device driver abstracts the hardware implementation of that device. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the virtual ticket audit device loads the new device driver from the at least one memory device to enable communication with the new device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. For example, when the at least one memory device uses flash memory or EPROM units configured to parameters, and settings, the software stored in the flash and/or EPROM memory units can be upgraded by replacing one or more memory units with new memory units that include the upgraded software.

In certain embodiments, the at least one memory device also stores authentication, validation and/or encryption components configured to authenticate/validate/encrypt specified information, such as hardware components, software components, firmware components, peripheral device components, user input device components, information received from one or more user input devices, and information stored in the at least one memory device. In certain other embodiments, the virtual ticket audit device additionally or alternatively includes one or more authentication, validation and/or encryption processors configured to authenticate/validate/encrypt specified information, such as hardware components, software components, firmware components, peripheral device components, user input device components, information received from one or more user input devices, and information stored in the at least one memory device.

In certain embodiments, the virtual ticket audit device includes one or more communication ports, such as one or more SAS ports and/or one or more Ethernet ports configured to enable the at least one processor of the controller to communicate and operate with one or more external peripherals, such as various components of: an EGM and/or and one or more gaming establishment management systems. For example, as seen in FIG. 1A, the virtual ticket audit device 102 (i.e., the eTicket Board) is in communication with an EGM 104 (which is in communication with a slot machine interface board ("SMIB") 106 supported by the EGM cabinet and in communication with a gaming establishment management system 108), a ticket printer 110 (i.e., a first component of the EGM) and a bill validator 112 (i.e., a second component of the EGM). It should be appreciated that in this illustrated example, the SMIB is a component of the gaming establishment management system while the virtual ticket audit device, the cashless wagering system (i.e. EZ Pay 114) and the cashless wagering system clerk validation terminal (i.e., EZ Pay CVT 116) are associated with the gaming establishment ticketing system. It should be further appreciated that any suitable communication device configured to communicate and operate with any component of any EGM, any mobile device, any gaming establishment system may be implemented in accordance with the virtual ticket audit device disclosed herein.

In certain embodiments, the virtual ticket audit device includes a display port used to communicate with one or more display devices. In certain of these embodiments, the display port couples the virtual ticket audit device to one or more display devices associated with the EGM and/or one or more display devices associated with a player tracking unit. In certain of these embodiments, the display port couples the virtual ticket audit device to a universal game adapter (which are configured to mix at least two video signals onto a single display device), over a communication or data link. In these embodiments, the display device communication or data link enables the virtual ticket audit device to cause the display of information pertaining to the creation and/or redemption of one or more virtual ticket vouchers.

In certain embodiments, the peripheral devices and interfaces of the virtual ticket audit device may include one or more of: at least one display device, such as an LCD output, at least one wireless communication component, such as a wireless communication interface utilizing one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol), at least one wired/wireless power component and/or one or more USB peripherals to enable communication between the virtual ticket audit device and any suitable peripheral device.

Virtual Ticket Audit Device Operation

In various embodiments, the virtual ticket audit device is configured to operate with one or more of: an EGM, a mobile device, and/or a gaming establishment ticketing system to facilitate the utilization of virtual ticket vouchers and additionally store information regarding the utilization of such virtual ticket vouchers.

In certain embodiments, as described above, the virtual ticket audit device receives virtual ticket voucher information from a mobile device. The virtual ticket audit device of these embodiments stores the virtual ticket voucher information and then transmits the virtual ticket voucher information to an EGM or a kiosk (where access to the amount of funds associated with the virtual ticket voucher information is provided to a user upon authentication of validity of the redeemed virtual ticket voucher). That is, rather than the redemption of virtual ticket vouchers occurring via the exchange of virtual ticket voucher information between a mobile device and an EGM or kiosk, the system disclosed herein enables the redemption of virtual ticket vouchers via the exchange of virtual ticket voucher information between a mobile device and the virtual ticket audit device followed by the exchange of virtual ticket voucher information between the virtual ticket audit device and the EGM or kiosk.

In certain embodiments, as described above, the virtual ticket audit device receives information for a ticket that needs to be printed from an EGM or kiosk. In these embodiments, rather than passing the ticket to the printer, the virtual ticket audit device creates virtual ticket voucher information, such as a virtual representation of the ticket. The virtual ticket audit device of these embodiments stores the virtual ticket voucher information and then transmits the virtual ticket voucher information to a mobile device (where the virtual ticket voucher is stored until a subsequent redemption). That is, rather than the issuance of virtual ticket vouchers occurring via the exchange of virtual ticket voucher information between an EGM or a kiosk and a mobile device, the system disclosed herein enables the issuance of virtual ticket vouchers via the exchange of virtual ticket voucher information between an EGM or kiosk and the virtual ticket audit device followed by the exchange of virtual ticket voucher information between the virtual ticket audit device and the mobile device.

In certain embodiments, the virtual ticket voucher information transmitted to/from the virtual ticket audit device and/or stored by the virtual ticket audit device includes, for each virtual ticket voucher redeemed and/or issued one or more of: a date of the virtual ticket voucher redemption/issuance, a validation number associated with the virtual ticket voucher, a property address associated with the virtual ticket voucher redemption/issuance, an amount of funds associated with the virtual ticket voucher, an expiration date associated with the virtual ticket voucher, an identification number, such as a ticket number, associated with the virtual ticket voucher, an EGM identification associated with the redemption/issuance of the virtual ticket voucher, a kiosk identification association with the redemption/issuance of the virtual ticket voucher, font or formatting information associated with the virtual ticket voucher. In certain embodiments, the virtual ticket voucher information transmitted to/from the virtual ticket audit device and/or stored by the virtual ticket audit device includes an image of each ticket voucher which is a virtual representation of that ticket voucher. In these embodiments, this image includes one or more of: an image of a front of the ticket voucher and/or an image of a back of a ticket voucher.

In operation of certain embodiments, the system utilizes the virtual ticket voucher information stored by the virtual ticket audit device to ensure a proper auditing of funds associated with such virtual ticket vouchers.

In certain such embodiments, at designated intervals, such as periodically or upon the occurrence of one or more events, the virtual ticket audit device writes the stored virtual ticket voucher information to a portable memory device, such as a USB memory device, inserted into a USB interface of the virtual ticket audit device.

In these embodiments, in association with the above-described audit/drop process carried out by gaming establishment personnel, the gaming establishment personnel remove the portable memory device from the virtual ticket audit device. Such a portable memory device includes data or information on each virtual ticket voucher used in association with the EGM since the last audit/drop process carried out by gaming establishment personnel. That is, the portable memory device stores the above-described virtual ticket voucher information tracked by the virtual ticket audit device over a designated period of time in association with the redemption and accumulation of virtual ticket vouchers at the EGM. In certain embodiment, the portable memory device also includes information or data associated with when the portable memory device was first inserted into the virtual ticket audit device.

Figure 1B:
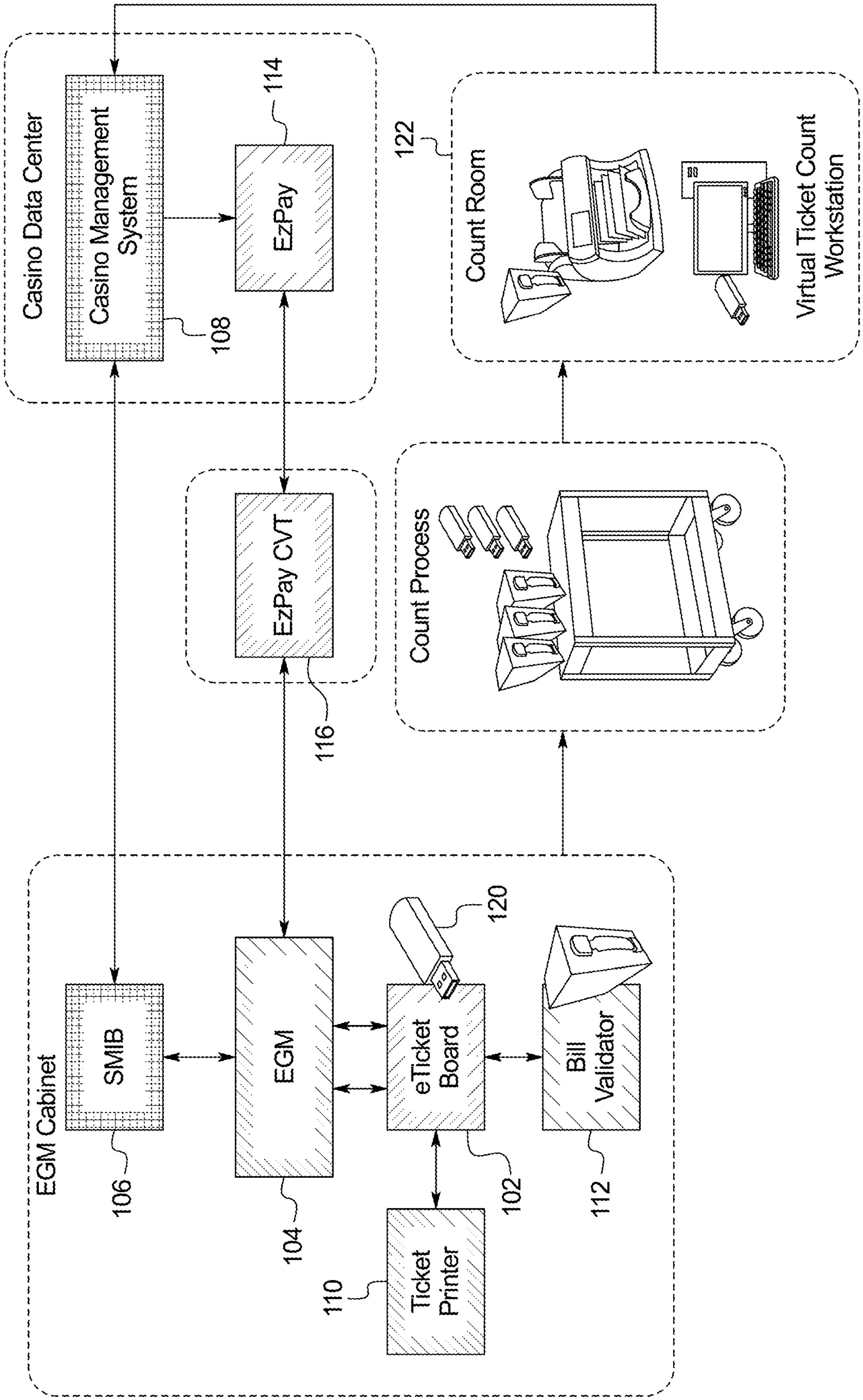
FIG. 1B is an example schematic configuration of the transfer of virtual ticket voucher information in association with the counting of virtual ticket vouchers in a count room of a gaming establishment.

As seen in FIG. 1B, in this illustrated embodiment, as part of the "drop team" activity employing the use of virtual ticket audit devices as described herein, in addition to gaming establishment personnel opening the main door of the EGM and collecting the bill validator's drop box 118 (i.e., which securely holds currency, gaming vouchers, coupons and Board-approved instruments inserted into the bill validator) inside the EGM, the gaming establishment personnel also remove the portable memory device 120 from the virtual ticket audit device 102. The "drop team" replaces the collected drop box with an empty drop box and further replaces the collected portable memory device with an empty or blank portable memory device. At the same time, when the main door of the EGM is opened to collect the drop box and portable memory device, the gaming establishment's accounting system snapshots the various EGM's meters, such as over a SAS protocol, a G2S protocol, or any other appropriate EGM to system protocol).

Once the bill validator drop boxes and portable memory devices across the gaming establishment floor have been collected (i.e., the illustrated count process), the collected bill validator drop boxes and portable memory devices are taken to the gaming establishment's count room 122. In the count room, in addition to counting the physical forms of currency and physical ticket vouchers associated with forms of currency obtained for each EGM, the information or data stored on the portable memory device are read as part of the count process. It should be appreciated that while described as transporting the virtual ticket voucher information from the EGM to the count room via transporting a collected memory device to the counter room, in certain embodiments, the virtual ticket audit device is operable to communicate or otherwise make available the virtual ticket voucher information to one or more servers, such as one or more servers of the count room, via any applicable communication protocol described herein (thereby eliminating the need to retrieve a physical memory device from each virtual ticket audit device).

For each EGM, information from the counting of physical forms of currency, the counting of physical ticket vouchers associated with forms of currency and the counting of virtual ticket vouchers associated with forms of currency is then transferred to the slot accounting system. The slot accounting system then compares meter movement between drops to the amount of physical forms of currency obtained from the bill validator's drop box, the amount of physical ticket vouchers obtained from the bill validator's drop box and the amount of virtual ticket vouchers tracked by the virtual ticket audit device. This comparison is then utilized by the gaming establishment and/or regulators in association with an accounting of the virtual ticket vouchers to maintain accurate metering of the system.

As such, by employing the virtual ticket audit device of the present disclosure, the gaming establishment and regulators now have the ability to track the transfers of virtual ticket vouchers thereby ensuring that such tracked virtual ticket voucher transfers are included in the information from the count process (which is transferred to the slot accounting system and compared against meter movement between drops). Accordingly, the virtual ticket audit device of the present disclosure provides a retrofit device which enables the gaming establishment and regulators to have a complete picture of the funds associated with wagering/winnings such that a proper comparison of this complete fund data can be utilized by the gaming establishment and/or regulators to confirm that nobody is improperly skimming or stealing money and that the all funds are accounted for.

Securing Transactions Between Mobile Device and Virtual Ticket Audit Device

While the facilitation of the transfer of virtual tickets to and from a virtual ticket audit device via a mobile device has many advantages described herein, certain security concerns arise when transferring fund data wirelessly between a virtual ticket audit device and a mobile device (or between a virtual ticket audit device and the mobile device via one or more servers). For example, a malicious person may attempt to intercept such a wireless communication and steal the funds being transferred. Such a malicious person may devise electronics, such as an antenna or other electronics placed on or near the EGM to insert their mobile device between a "cash out" input and the mobile device engaging the EGM.

More specifically, when facilitating the transfer of a virtual ticket voucher from the EGM to a mobile device via the virtual ticket audit device and the mobile device application, a player initiates an engagement of the virtual ticket audit device with the mobile device, such as tapping the mobile device to a designated location(s) of the EGM associated with the virtual ticket audit device. However, before the engagement of the virtual ticket audit device with the player's mobile device is complete, an intruder utilizes such devised electronics to beat the player to the completion of the engagement. In this example, when the player subsequently actuates a "cash out" button on the EGM, the virtual ticket audit device proceeds with transferring the amount of the credit balance of the mobile device of the intruder. Such a concern is also present when a player attempts to wirelessly transfer funds to a virtual ticket audit device via a mobile device (and then to an EGM) wherein the intruder device intercepts such a transfer and reroutes the funds to the mobile device of the intruder.

In view of these security concerns, certain embodiments of the present disclosure utilize a time window, such as ten seconds, in association with one or more requested actions. In one such embodiment, after receiving an initiation of an engagement of the virtual ticket audit device with the mobile device, the virtual ticket audit device assigns or otherwise associates a time window with such an engagement. If one mobile device is attempted to be paired with the virtual ticket audit device within the associated time window before an action is requested, the virtual ticket audit device determines that only one mobile device is communicating with the virtual ticket audit device and the virtual ticket audit device proceeds with executing the requested action. On the other hand, if more than one mobile device is attempted to be paired with the virtual ticket audit device within the associated time window before an action is requested, the virtual ticket audit device determines that an intruder device may be present. In such a situation, the virtual ticket audit device cancels the requested action and/or prompts the player to reengage the virtual ticket audit device (i.e., a portion of the EGM associated with the virtual ticket audit device) with the mobile device.

In another such embodiment, after receiving a requested action from the mobile device, the virtual ticket audit device assigns or otherwise associates a time window with such a requested action. Following the requested action, if one mobile device is attempted to be paired with the virtual ticket audit device within the associated time window, the virtual ticket audit device determines that only one mobile device is communicating with the virtual ticket audit device and the virtual ticket audit device proceeds with executing the requested action. On the other hand, following the requested action, if more than one mobile device is attempted to be paired with the virtual ticket audit device within the associated time window, the virtual ticket audit device determines that an intruder device may be present. In such a situation, the EGM cancels the requested action and/or prompts the player to reengage the virtual ticket audit device (i.e., a portion of the EGM associated with the virtual ticket audit device) with the mobile device.

It should be appreciated that in addition to thwarting an isolated attempt by an intruder to intercept a wireless transfer of virtual tickets, the system is configured to identify if a device is involved in multiple attempted engagements with a virtual ticket audit device over a designated threshold or time window. In this embodiment, such a device may be prohibited from being involved in further wireless transfers of virtual tickets. For example, if multiple engagements are detected involving a single device within a twenty-four hour period, then that mobile device could be banned from participating in any future engagements. Alternatively, that device could be prevented from participating in engagements for a designated period of time, such as a cooling-off period.

Mobile Device/Virtual Ticket Audit Device Communications

As indicated above, in various embodiments, the facilitation of the transfer of virtual ticket vouchers between a mobile device and an EGM is accomplished by the combination of: transferring such virtual ticket vouchers between the mobile device and the virtual ticket audit device, and transferring such virtual ticket voucher between the virtual ticket audit device and the EGM. In such embodiments, as indicated above, the virtual ticket audit device of the present disclosure includes one or more mobile device interfaces for communicating with a mobile device utilizing one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol).

In certain embodiments, the communication with the mobile device can occur through one or more wireless interfaces of the virtual ticket audit device. Such wireless interfaces are configured to receive information, such as information associated with one or more virtual ticket vouchers and instructions to initiate a transfer of virtual ticket vouchers to and from the mobile device and the virtual ticket audit device.

In one embodiment, the wireless interface is integrated into the cabinet of the EGM and the virtual ticket audit device processor is configured to communicate directly with and send control commands to the wireless interface. In another embodiment, the wireless interface is integrated into a device mounted to and/or within the EGM cabinet, such as a player tracking unit or a player identification device of a player tracking unit. In certain embodiments where the wireless interface is embedded in a secondary device, such as a player tracking unit, the virtual ticket audit device processor sends control commands to control the wireless interface via a secondary controller, such as a player tracking controller.

In certain embodiments disclosed herein, the wireless interface implements an NFC protocol to facilitate the transfer of virtual ticket vouchers between a mobile device and a virtual ticket audit device. In other embodiments, the wireless interface implements a Wi-Fi, cellular and/or Bluetooth™ communications protocol to facilitate the transfer of virtual ticket vouchers between a mobile device and a virtual ticket audit device. It should be appreciated that Wi-Fi, cellular or Bluetooth™ communication protocols can be used in lieu of or in combination with NFC. For instance, an NFC communication can be used to instantiate a Wi-Fi or Bluetooth™ communication between the virtual ticket audit device, zero, one or more servers and a mobile device, such as secure pairing using one of these protocols. That is, in one embodiment, an NFC interface on an EGM can be used to set-up a higher speed communication between the virtual ticket audit device, zero, one or more servers and the NFC enabled mobile device. The higher speed communication rates can be used for expanded content sharing. For instance, a NFC and Bluetooth enabled virtual ticket audit device can be tapped by an NFC and Bluetooth enabled mobile device for instant Bluetooth pairing between the devices and zero, one or more servers. Instant Bluetooth pairing between an virtual ticket audit device, an NFC enabled mobile device and zero, one or more servers, can save searching, waiting, and entering codes. In another example, a virtual ticket audit device can be configured as an NFC enabled router, such as a router supporting a Wi-Fi communication standard. Tapping an NFC enabled mobile device to an NFC enabled and Wi-Fi enabled virtual ticket audit device can be used to establish a Wi-Fi connection between the devices and zero, one or more servers.

In certain embodiments which implement a Wi-Fi, cellular and/or Bluetooth™ communications protocol, the system utilizes one or more QR codes generated by the EGM to facilitate the communication of data between the mobile device and the virtual ticket audit device. In such embodiments, the QR code is used to identify the EGM (which is associated with a virtual ticket audit device) that is displaying the QR code to identify the server to which the mobile device should connect. More specifically, in certain embodiments, the player requests, via an input at the EGM and/or the mobile device, the generation of a QR code by the EGM. In response to the player's request, the EGM or a player tracking unit displays a QR code. Such an on-demand QR code remains valid for a designated amount of time such that if the player does not scan the QR code within the designated amount of time, another QR code is necessary to be scanned to connect the mobile device to the virtual ticket audit device.

In these embodiments, the player scans the QR code with the mobile device application. If the gaming system determines that the QR code is valid (i.e., not expired), the mobile device application will connect to the virtual ticket audit device. It should be appreciated that as long as the established connection between the mobile device and the virtual ticket audit device remains active, one or more gaming system servers and mobile device may communicate data, such as status updates, as necessary. It should be further appreciated that in association with the Wi-Fi or Bluetooth™ or mobile device network communications protocol described herein, any action requested by the player via the mobile device application does not require a new engagement between the mobile device and the virtual ticket audit device.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3:
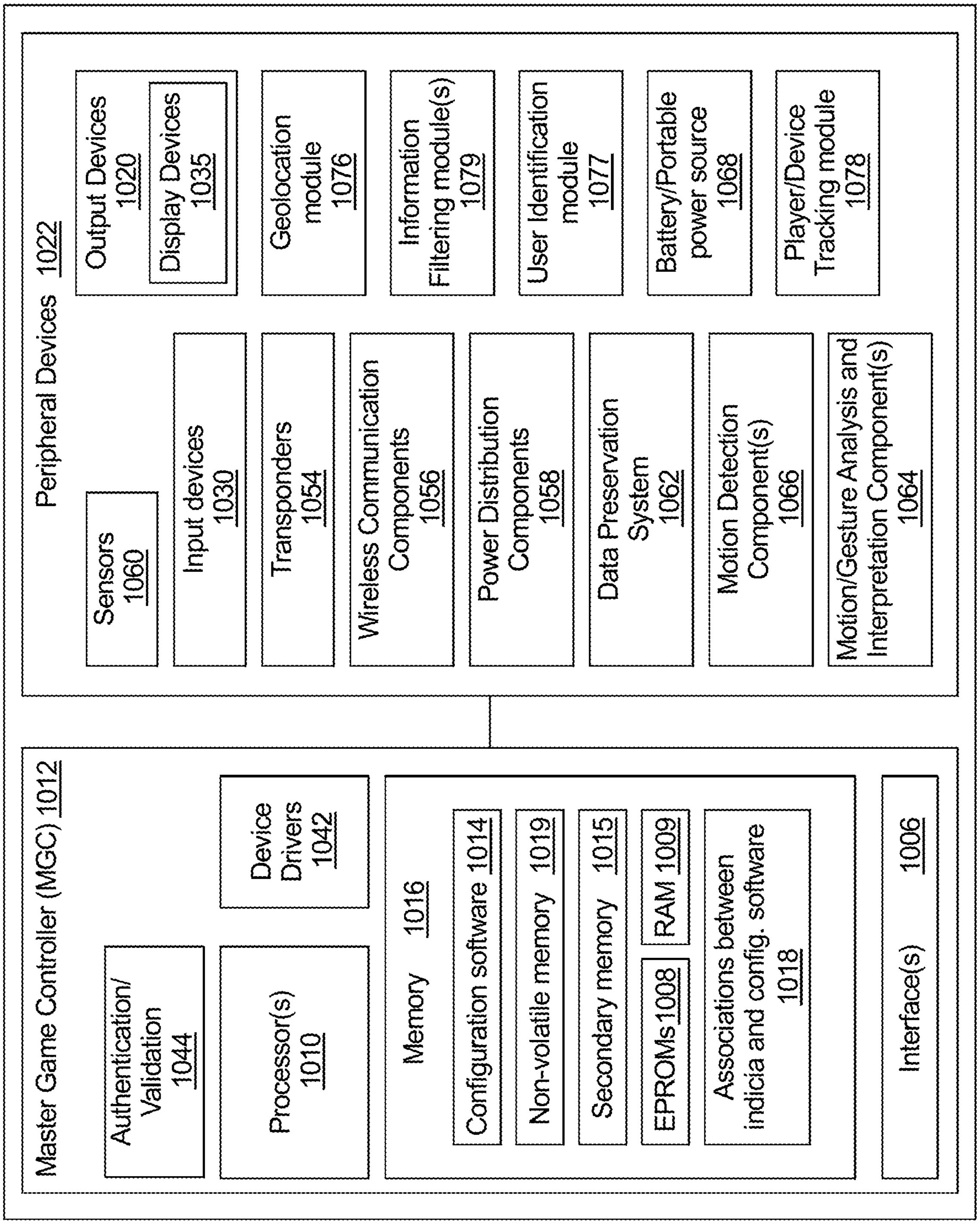
FIG. 3 is a schematic block diagram of one embodiment of an electronic configuration of an example gaming system disclosed herein.
Figure 4A:
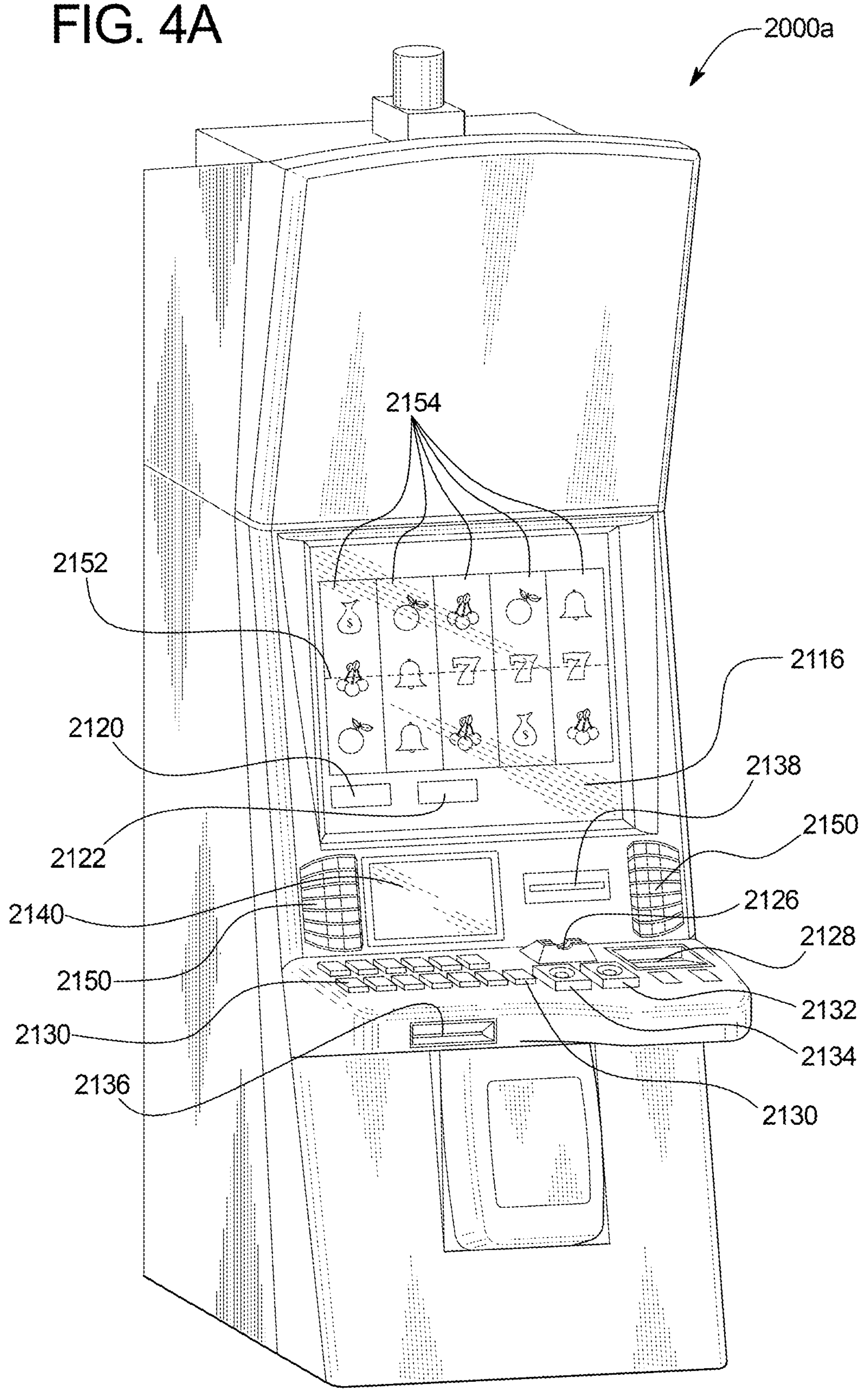
FIGS. 4A and 4B are perspective views of example alternative embodiments of the gaming system disclosed herein.
Figure 4B:
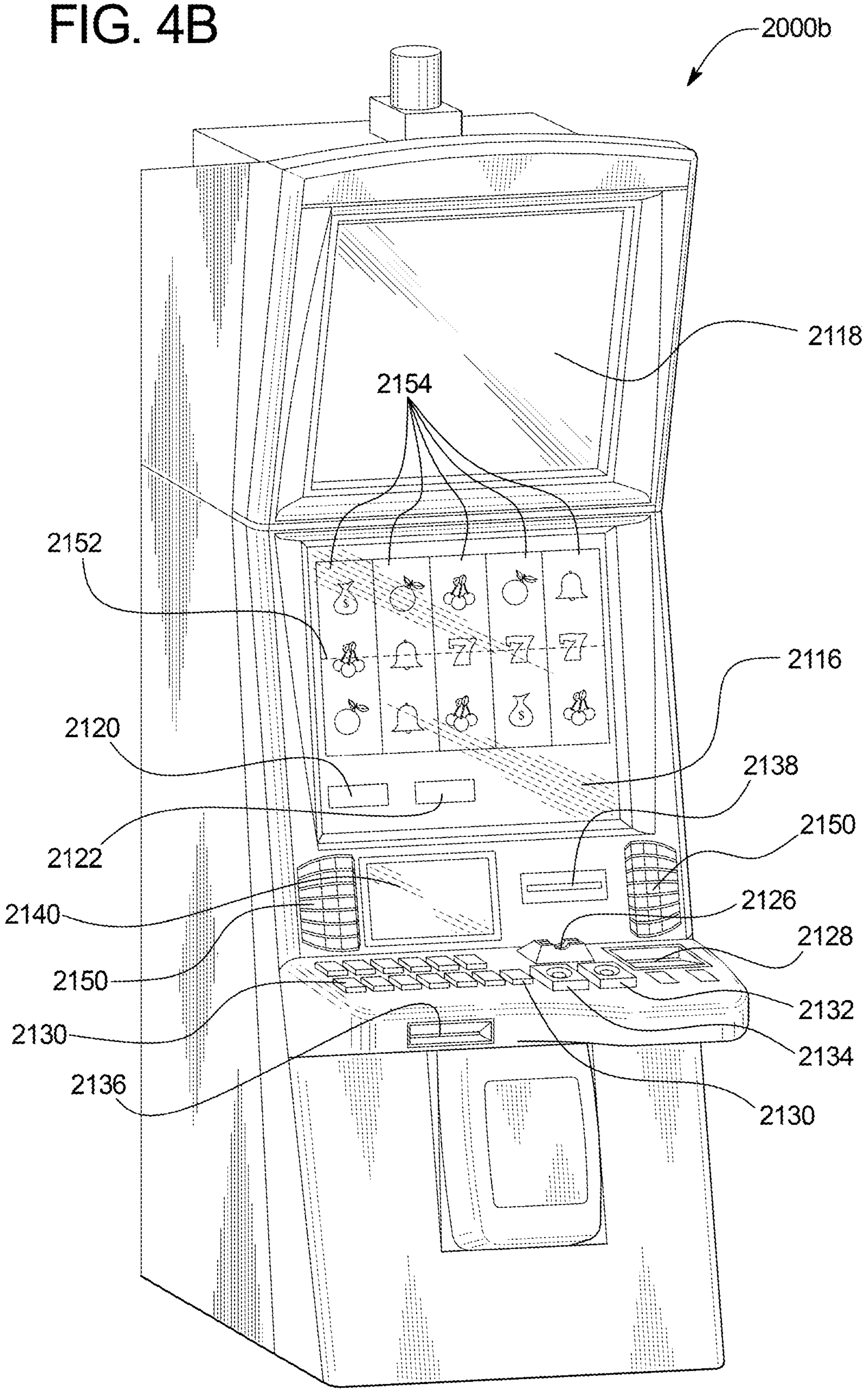

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices may includes some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 4B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity," which is incorporated herein by reference.

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A virtual ticket audit device comprising:

a support structure configured to be supported by a housing of an electronic gaming machine, wherein the electronic gaming machine, a master gaming controller of the electronic gaming machine, a bill validator supported by the housing of the electronic gaming machine, a ticket printer supported by the housing of the electronic gaming machine, and a player tracking unit supported by the housing of the electronic gaming machine are each distinct from the virtual ticket audit device;

a port supported by the support structure;

a wireless communication interface supported by the support structure, wherein the wireless communication interface is distinct from and configured to operate independent of any operation of any wireless communication component of the electronic gaming machine;

a processor supported by the support structure, the processor being distinct from a processor of the electronic gaming machine and distinct from the wireless communication interface; and a memory device supported by the support structure, said memory device being distinct from a memory device of the electronic gaming machine, distinct from the wireless communication interface and storing a plurality of instructions, which when executed by the processor, cause the processor to:

receive, from a mobile device and via the wireless communication interface, first data associated with a virtual ticket voucher accessible via a mobile device application of the mobile device, said virtual ticket voucher associated with a value, wherein the first data associated with the virtual ticket voucher is received from the mobile device prior to the first data associated with the virtual ticket voucher being communicated to the electronic gaming machine, store, via the memory device of the virtual ticket audit device and independent of storage by the memory device of the electronic gaming machine, virtual ticket voucher identifying information associated with the virtual ticket voucher, after the memory device stores the virtual ticket voucher identifying information associated with the virtual ticket voucher, communicate the first data associated with the virtual ticket voucher to the electronic gaming machine, wherein responsive to the first data associated with the virtual ticket voucher being communicated to the electronic gaming machine, the processor of the electronic gaming machine causes a modification of a credit balance of the electronic gaming machine based on the value associated with the virtual ticket voucher, and communicate the virtual ticket voucher identifying information associated with the virtual ticket voucher to a portable memory device inserted into the port, wherein the portable memory device is distinct from a drop box of the bill validator supported by the housing of the electronic gaming machine distinct from the mobile device, distinct from the memory device of the virtual ticket audit device, and distinct from the memory device of the electronic gaming machine.

2. The virtual ticket audit device of claim 1, wherein the virtual ticket voucher identifying information is at least one of: a date when the virtual ticket voucher was issued, a validation number associated with the virtual ticket voucher, a property address associated with the virtual ticket voucher, the value of the virtual ticket voucher, an expiration date of the virtual ticket voucher, an identification number of the virtual ticket voucher, an identification of an asset number which issued the virtual ticket voucher and an image of a ticket voucher representative of the virtual ticket voucher.

3. The virtual ticket audit device of claim 1, wherein the communication of the virtual ticket voucher identifying information associated with the virtual ticket voucher to the portable memory device occurs prior to an occurrence of a collection event.

4. The virtual ticket audit device of claim 1, wherein the virtual ticket voucher identifying information associated with the virtual ticket voucher communicated to the portable memory device is subsequently transferred to a server of a slot accounting system in association with an accounting of activity of the electronic gaming machine, the transfer of the virtual ticket voucher identifying information associated with the virtual ticket voucher occurring independent of any data communicated from the electronic gaming machine to the server of the slot accounting system.

5. The virtual ticket audit device of claim 1, wherein when executed by the processor, the instructions cause the processor to communicate the stored virtual ticket voucher identifying information associated with the virtual ticket voucher to a server of a slot accounting system in association with an accounting of activity of the electronic gaming machine, the transfer of the virtual ticket voucher identifying information associated with the virtual ticket voucher occurring independent of any data communicated from the electronic gaming machine to the server of the slot accounting system.

6. The virtual ticket audit device of claim 1, wherein the first data is communicated to the electronic gaming machine in place of data being communicated from the bill validator supported by the housing of the electronic gaming machine.

7. A virtual ticket audit device comprising:

a support structure configured to be supported by a housing of an electronic gaming machine, wherein the electronic gaming machine, a master gaming controller of the electronic gaming machine, a bill validator supported by the housing of the electronic gaming machine, a ticket printer supported by the housing of the electronic gaming machine, and a player tracking unit supported by the housing of the electronic gaming machine are each distinct from the virtual ticket audit device;

a port supported by the support structure;

a wireless communication interface supported by the support structure, wherein the wireless communication interface is distinct from and configured to operate independent of any operation of any wireless communication component of the electronic gaming machine;

a processor supported by the support structure, the processor being distinct from a processor of the electronic gaming machine and distinct from the wireless communication interface; and a memory device supported by the support structure, said memory device being distinct from a memory device of the electronic gaming machine, distinct from the wireless communication interface and storing a plurality of instructions, which when executed by the processor, cause the processor to:

responsive to an input being made to cashout a credit balance of the electronic gaming machine, receive first data associated with a virtual ticket voucher from the electronic gaming machine, said virtual ticket voucher having a value based on the cashed out credit balance of the electronic gaming machine, wherein the first data associated with the virtual ticket voucher is received from the electronic gaming machine prior to the first data associated with the virtual ticket voucher being communicated to any mobile device, store, via the memory device of the virtual ticket audit device and independent of storage by the memory device of the electronic gaming machine, virtual ticket voucher identifying information associated with the virtual ticket voucher, after the memory device stores virtual ticket voucher identifying information associated with the virtual ticket voucher, communicate, via the wireless communication interface, the first data associated with the virtual ticket voucher to a mobile device, and communicate the virtual ticket voucher identifying information associated with the virtual ticket voucher to a portable memory device inserted into the port, wherein the portable memory device is distinct from a drop box of the bill validator supported by the housing of the electronic gaming machine distinct from the mobile device, distinct from the memory device of the virtual ticket audit device, and distinct from the memory device of the electronic gaming machine.

8. The virtual ticket audit device of claim 7, wherein the virtual ticket voucher identifying information is at least one of: a date when the virtual ticket voucher was issued, a validation number associated with the virtual ticket voucher, a property address associated with the virtual ticket voucher, the value of the virtual ticket voucher, an expiration date of the virtual ticket voucher, an identification number of the virtual ticket voucher, an identification of an asset number which issued the virtual ticket voucher and an image of a ticket voucher representative of the virtual ticket voucher.

9. The virtual ticket audit device of claim 7, wherein the communication of the virtual ticket voucher identifying information associated with the virtual ticket voucher to the portable memory device occurs prior to an occurrence of a collection event.

10. The virtual ticket audit device of claim 7, wherein the virtual ticket voucher identifying information associated with the virtual ticket voucher communicated to the portable memory device is subsequently transferred to a server of a slot accounting system in association with an accounting of activity of the electronic gaming machine, the transfer of the virtual ticket voucher identifying information associated with the virtual ticket voucher occurring independent of any data communicated from the electronic gaming machine to the server of the slot accounting system.

11. The virtual ticket audit device of claim 7, wherein when executed by the processor, the instructions cause the processor to communicate the stored virtual ticket voucher identifying information associated with the virtual ticket voucher to a server of a slot accounting system in association with an accounting of activity of the electronic gaming machine, the transfer of the virtual ticket voucher identifying information associated with the virtual ticket voucher occurring independent of any data communicated from the electronic gaming machine to the component of the slot accounting system.

12. The virtual ticket audit device of claim 7, wherein the first data is communicated from the electronic gaming machine in place of data being communicated to the ticket printer supported by the housing of the electronic gaming machine.

13. A method of operating a virtual ticket audit device, the method comprising:

responsive to receipt, from a mobile device and via a wireless communication interface, of first data associated with a first virtual ticket voucher accessible via a mobile device application of the mobile device:

storing, via a memory device of the virtual ticket audit device that is distinct from the wireless communication interface and independent of storage by a memory device of an electronic gaming machine, first virtual ticket voucher identifying information associated with the first virtual ticket voucher, wherein:

the first virtual ticket voucher is associated with a first value, the electronic gaming machine, a master gaming controller of the electronic gaming machine, a bill validator supported by a housing of the electronic gaming machine, a ticket printer supported by the housing of the electronic gaming machine, and a player tracking unit supported by the housing of the electronic gaming machine are each distinct from the virtual ticket audit device, and the wireless communication interface is configured to operate independent of any operation of any wireless communication component of the electronic gaming machine, after the memory device stores first virtual ticket voucher identifying information associated with the first virtual ticket voucher, communicating the first data associated with the first virtual ticket voucher to the electronic gaming machine, wherein responsive to the first data associated with the first virtual ticket voucher being communicated to the electronic gaming machine, a processor of the electronic gaming machine causes a modification of a credit balance of the electronic gaming machine based on the first value associated with the first virtual ticket voucher and the first data associated with the first virtual ticket voucher is received from the mobile device prior to the first data associated with the first virtual ticket voucher being communicated to the electronic gaming machine, and communicating the first virtual ticket voucher identifying information associated with the first virtual ticket voucher to a portable memory device inserted into a port supported by the housing of the electronic gaming machine, wherein the portable memory device is distinct from a drop box of the bill validator supported by the housing of the electronic gaming machine, distinct from the mobile device, distinct from the memory device of the virtual ticket audit device, and distinct from the memory device of the electronic gaming machine, and responsive to an input being made to cashout the credit balance of the electronic gaming machine:

receiving second data associated with a second virtual ticket voucher from the electronic gaming machine, said second virtual ticket voucher having a second value based on the cashed out credit balance of the electronic gaming machine, storing, via the memory device of the virtual ticket audit device and independent of storage by the memory device of the electronic gaming machine, second virtual ticket voucher identifying information associated with the second virtual ticket voucher, after storing second virtual ticket voucher identifying information associated with the second virtual ticket voucher, communicating, via the wireless communication interface, the second data associated with the second virtual ticket voucher to the mobile device, wherein the second data associated with the second virtual ticket voucher is received from the electronic gaming machine prior to the second data associated with the second virtual ticket voucher being communicated to the mobile device, and communicating the second virtual ticket voucher identifying information associated with the second virtual ticket voucher to the portable memory device.

14. The method of claim 13, wherein the first virtual ticket voucher identifying information is at least one of: a date when the first virtual ticket voucher was issued, a validation number associated with the first virtual ticket voucher, a property address associated with the first virtual ticket voucher, the first value of the first virtual ticket voucher, an expiration date of the first virtual ticket voucher, an identification number of the first virtual ticket voucher, an identification of an asset number which issued the first virtual ticket voucher and an image of a ticket voucher representative of the first virtual ticket voucher.

15. The method of claim 13, wherein the communication of the first virtual ticket voucher identifying information associated with the first virtual ticket voucher to the portable memory device occurs prior to an occurrence of a collection event.

16. The method of claim 15, wherein the communication of the second virtual ticket voucher identifying information associated with the second virtual ticket voucher to the portable memory device occurs prior to the occurrence of the collection event.

17. The method of claim 13, wherein the first virtual ticket voucher identifying information associated with the first virtual ticket voucher communicated to the portable memory device and the second virtual ticket voucher identifying information associated with the second virtual ticket voucher stored by the portable memory device are subsequently transferred to a server of a slot accounting system in association with the accounting of activity of the electronic gaming machine.

18. The method of claim 13, further comprising communicating the stored first virtual ticket voucher identifying information associated with the first virtual ticket voucher to a server of a slot accounting system in association with an accounting of activity of the electronic gaming machine.

19. The method of claim 18, further comprising communicating the stored second virtual ticket voucher identifying information associated with the second virtual ticket voucher to the server of the slot accounting system in association with the accounting of activity of the electronic gaming machine.

* * * * *